US009750230B2

(12) United States Patent
Komatsubara et al.

(10) Patent No.: US 9,750,230 B2
(45) Date of Patent: Sep. 5, 2017

(54) ABSORBENT ARTICLE FOR PET AND MANUFACTURING METHOD THEREOF

(75) Inventors: Daisuke Komatsubara, Kanonji (JP); Takeshi Ikegami, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 636 days.

(21) Appl. No.: 14/126,415

(22) PCT Filed: Jun. 14, 2012

(86) PCT No.: PCT/JP2012/003892
§ 371 (c)(1),
(2), (4) Date: Dec. 13, 2013

(87) PCT Pub. No.: WO2012/172806
PCT Pub. Date: Dec. 20, 2012

(65) Prior Publication Data
US 2015/0196009 A1    Jul. 16, 2015

(30) Foreign Application Priority Data

Jun. 14, 2011 (JP) ................................. 2011-132546

(51) Int. Cl.
*A01K 23/00*  (2006.01)
*B31D 1/04*  (2006.01)

(52) U.S. Cl.
CPC ............... *A01K 23/00* (2013.01); *B31D 1/04* (2013.01)

(58) Field of Classification Search
CPC ................. A01K 23/00; A01K 13/006; A61F 2013/15186; A61F 13/5622; A61F 13/62;
(Continued)

(56) References Cited

U.S. PATENT DOCUMENTS 4,577,591 A * 3/1986 Wesseldine ............ A01K 23/00
119/850
4,775,375 A * 10/1988 Aledo ............... A61F 13/49007
604/378
(Continued)

FOREIGN PATENT DOCUMENTS

JP         2-79919 U    6/1990
JP     2004-159592 A    6/2004
(Continued)

OTHER PUBLICATIONS

Extended European Search Report issued Mar. 24, 2015, corresponding to European patent application No. 12800662.4.

*Primary Examiner* — Trinh Nguyen
(74) *Attorney, Agent, or Firm* — Hauptman Ham, LLP

(57) ABSTRACT

An absorbent article for pet to be worn and wrapped around a waist thereof, includes: a liquid permeable top sheet; a liquid impermeable back surface layer; an absorbent core; a first end portion and a second end portion opposing to each other; a first side portion and a second side portion opposing to each other, a first gather portion that is disposed on a top sheet side of the first side portion and configured to stand upright from the top sheet; a second gather portion that is disposed on the top sheet side of the second side portion and configured to stand upright from the top sheet; and a pair of releasably-joined portions in which the first gather portion is releasably-joined to itself in a state of being folded outward in the width direction of the absorbent article for pet, in the first end portion and the second end portion.

14 Claims, 20 Drawing Sheets

(58) Field of Classification Search
CPC ... A61F 5/4401; A61F 13/49; A61F 13/49014
USPC .............. 119/869, 867, 868, 850, 856, 171;
604/358, 385.01–385.05, 385.11, 385.201,
604/385.23, 385.24, 386, 387, 389, 391
See application file for complete search history.

(56) References Cited

U.S. PATENT DOCUMENTS

| | | | |
|---|---|---|---|
| 4,996,949 A * | 3/1991 | Wunderman | A01K 23/00 119/850 |
| 5,555,847 A * | 9/1996 | Kelly | A01K 23/00 119/850 |
| 5,954,015 A * | 9/1999 | Ohta | A01K 23/00 119/850 |
| 2005/0154367 A1* | 7/2005 | Ikegami | A01K 23/00 604/389 |
| 2006/0217678 A1* | 9/2006 | Ikegami | A01K 23/00 604/386 |
| 2007/0129702 A1 | 6/2007 | Gribben | |
| 2007/0149941 A1* | 6/2007 | Ikegami | A01K 23/00 604/385.09 |
| 2010/0094235 A1* | 4/2010 | Solomon | A01K 23/00 604/359 |
| 2011/0209675 A1* | 9/2011 | Esperon | A01K 23/00 119/868 |
| 2014/0107606 A1* | 4/2014 | Komatsubara | A01K 23/00 604/391 |
| 2014/0109843 A1* | 4/2014 | Komatsubara | A01K 23/00 119/869 |
| 2014/0290589 A1* | 10/2014 | Komatsubara | A01K 23/00 119/869 |

FOREIGN PATENT DOCUMENTS

| | | |
|---|---|---|
| JP | 2007-020533 A | 2/2007 |
| JP | 3141580 U | 4/2008 |
| JP | 2009-254278 A | 11/2009 |
| WO | 2012/164962 A1 | 12/2012 |

* cited by examiner

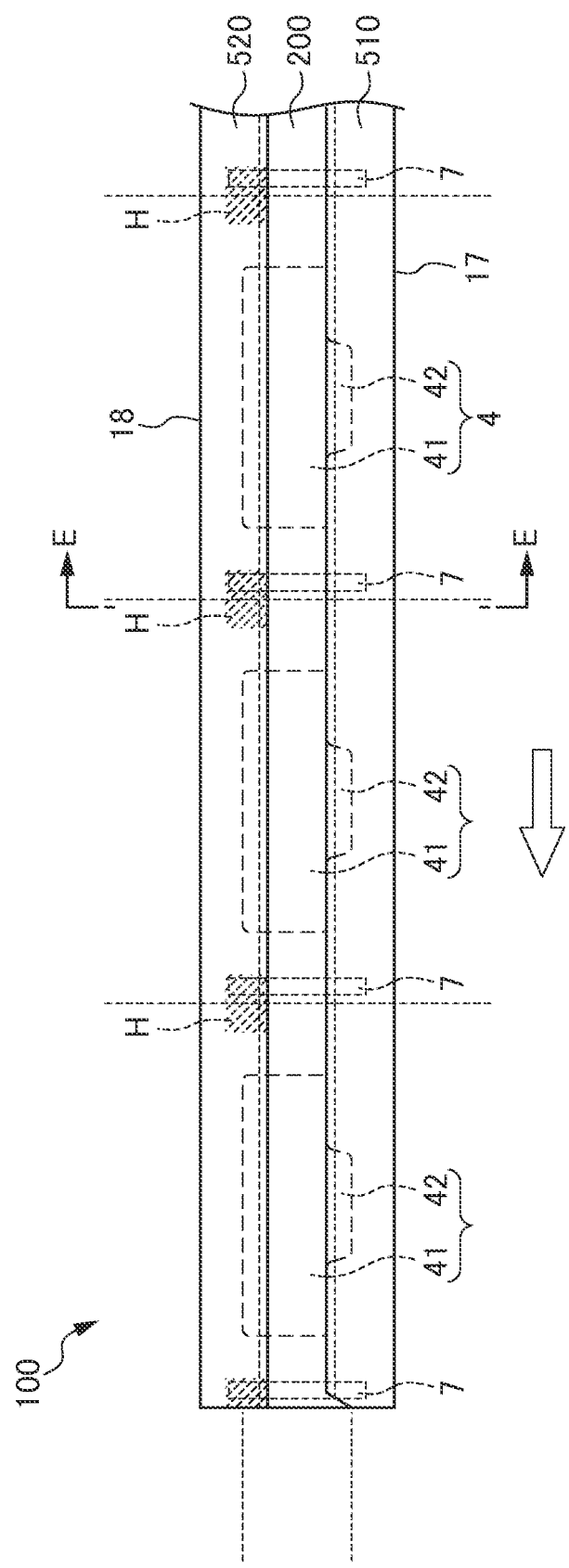

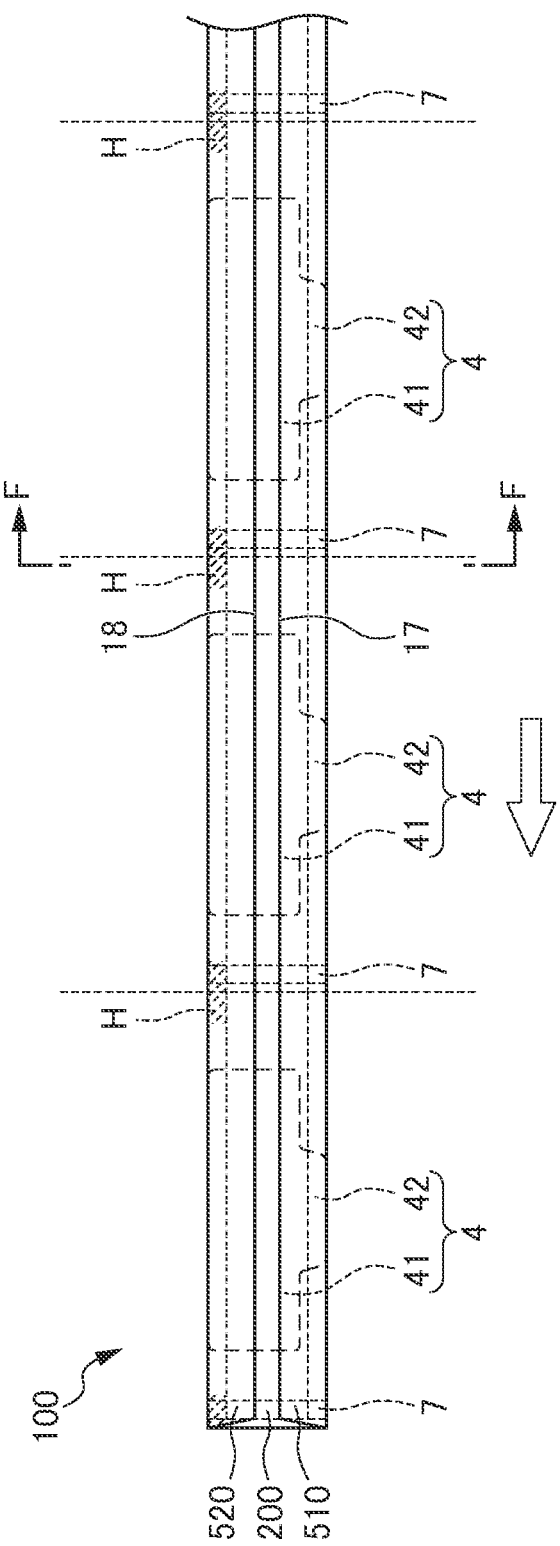

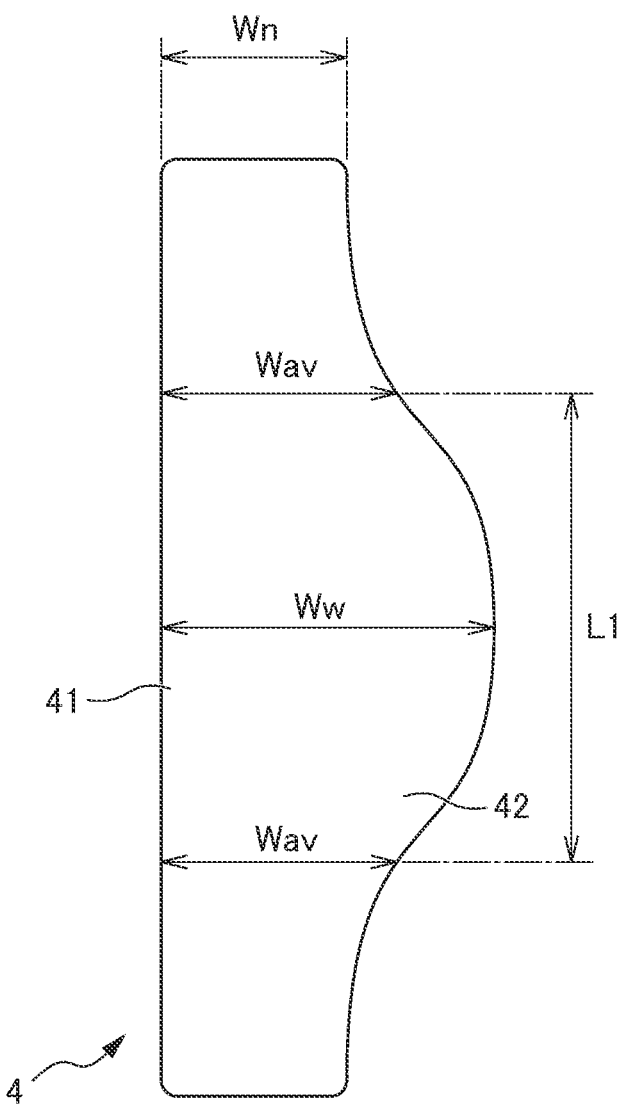

US 9,750,230 B2

ABSORBENT ARTICLE FOR PET AND MANUFACTURING METHOD THEREOF

RELATED APPLICATIONS

The present application is a National Phase of International Application Number PCT/JP2012/003892 filed Jun. 14, 2012, which claims priority to Japanese Application No. 2011-132546 filed Jun. 14, 2011.

TECHNICAL FIELD

The present disclosure relates to an absorbent article for pet.

BACKGROUND ART

A disposable diaper for pet to be used for pet, such as dog and cat has been known to the inventors. Such a disposable diaper for pet catches feces and urine of pet by covering the anus and the urethral opening positioned between bases of hind legs when being worn.

Some of pets (for example miniature dachshund having short legs and a long abdomen) have the urethral opening further toward the front than a position between bases of hind legs. In addition, male dogs have the urethral opening further toward the front than female dogs.

Given this, an absorbent article for pet that is to be used in a state of being wrapped around a pet's waist is known to the inventors. Such an absorbent article for pet includes an absorbent core, a liquid permeable top sheet disposed on a first face of the absorbent core, and a liquid impermeable back surface layer disposed on a second face of the absorbent core, and is configured in a rectangular shape, in which three-dimensional gathers are provided on two sides in the longitudinal direction.

Upon putting on the absorbent article for pet described above, the upright part of the gather positioned on the back side of the pet's body is brought into contact with a base of the pet's sex organ (urinary organ). The gather is thus positioned behind the pet's urinary organ, to thereby prevent leakage of urine.

However, the inventor(s) has recognized that in the absorbent article for pet described above, in case the upright part of the gather positioned on the back side of the pet's body is configured to be shorter, the gather is easy to incline inward (i.e., forward) during putting the absorbent article for pet on the pet. If the gather inclines inward, the gather no longer can cover the back side of the pet's urinary organ, and urine may leak. In addition, since the absorbent article for pet is put on in a state in which the gather with the shorter upright part is in contact with the base of the pet's sex organ, an intense stress is applied to the base of the sex organ and the pet may be physically stressed.

SUMMARY OF INVENTION

According to some embodiments of the present invention, an absorbent article for pet is configured to be worn in a state of being wrapped around a waist of a pet, and has a longitudinal direction and a width direction. The absorbent article for pet includes: a liquid permeable top sheet; a liquid impermeable back surface layer; an absorbent core disposed between the top sheet and the back surface layer; a first end portion and a second end portion opposing to each other in the longitudinal direction of the absorbent article for pet; a first side portion and a second side portion opposing to each other in the width direction of the absorbent article for pet; a first gather portion that is disposed on a top sheet side of the first side portion and configured to stand upright from the top sheet; a second gather portion that is disposed on the top sheet side of the second side portion and configured to stand upright from the top sheet; and a pair of releasably-joined portions in which the first gather portion is releasably-joined to itself in a state of being folded outward in the width direction of the absorbent article for pet, in the first end portion and the second end portion.

According to further embodiments of the present invention, a manufacturing method of an absorbent article for pet is provided. The absorbent article for pet has a longitudinal direction and a width direction and includes: a liquid permeable top sheet; a liquid impermeable back surface layer; an absorbent core disposed between the top sheet and the back surface layer; a first end portion and a second end portion opposing to each other in the longitudinal direction of the absorbent article for pet; a first side portion and a second side portion opposing to each other in the width direction of the absorbent article for pet; a first side sheet that is disposed on a top sheet side of the first side portion, has an outer edge joined with the back surface layer and has an inner edge at least a part of which is a free end; a second side sheet that is disposed on the top sheet side of the second side portion, has an outer edge joined with the back surface layer and has an inner edge at least a part of which is a free end; and a pair of releasably-joined portions in which the first side sheet is releasably-joined to itself in a state of being folded outward in the width direction, in the first end portion and the second end portion. The manufacturing method includes: a continuous body forming step of forming a continuous body for forming the absorbent article in which a plurality of absorbent cores are arranged at predetermined intervals in the longitudinal direction between a continuous top sheet and a continuous back surface layer, and a continuous first side sheet and a continuous second side sheet are arranged on two sides of the continuous top sheet; a first folding step of folding the sides of the continuous body such that the continuous first side sheet and the continuous second side sheet are folded back in the width direction; and a cutting step of cutting the continuous body after the first folding step at predetermined intervals in the longitudinal direction. The pair of releasably-joined portions is formed in the cutting step.

BRIEF DESCRIPTION OF DRAWINGS

FIG. 12A is a plan view illustrating a continuous body forming step in a manufacturing method of the absorbent article for pet according to the first embodiment;

FIG. 13A is a plan view illustrating a fold-back structure in the manufacturing method of the absorbent article for pet according to the first embodiment;

FIG. 18 is a diagram illustrating an example of a shape of the absorbent core.

DESCRIPTION OF EMBODIMENTS

Embodiments of the absorbent article for pet will be described hereinafter with reference to the drawings.

First, the absorbent article for pet according to the first embodiment will be described hereinafter with reference to FIGS. 1 to 7.

Figure 1:
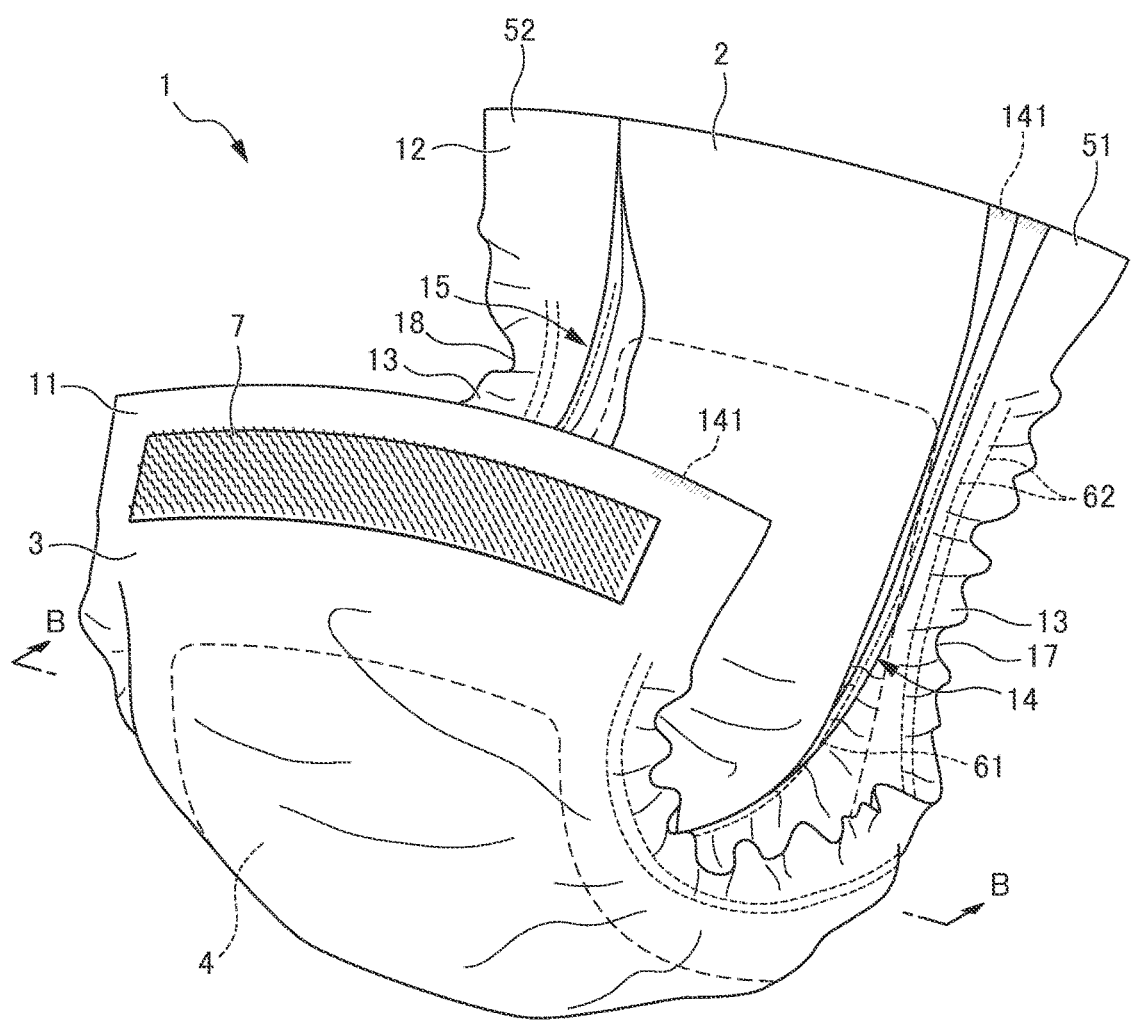
FIG. 1 is a perspective view illustrating an absorbent article for pet according to a first embodiment of the present invention.
Figure 2:
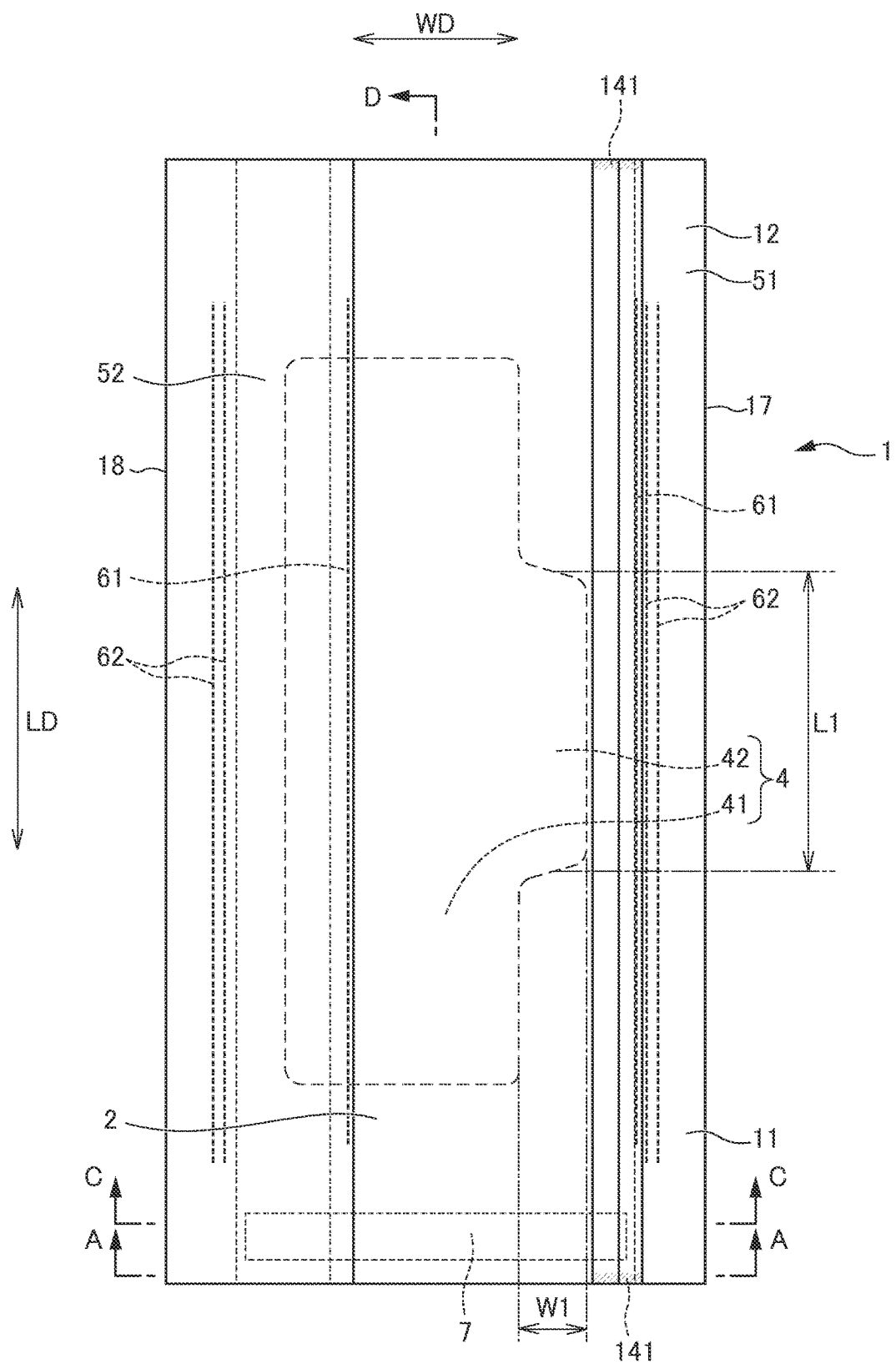
FIG. 2 is a plan view of the absorbent article for pet according to the first embodiment, as viewed from a top sheet side.

As shown in FIGS. 1 and 2, an absorbent article for pet 1 according to the first embodiment is configured in a rectangular shape having a longitudinal direction and a width direction. The absorbent article for pet 1 has a first end portion 11 and a second end portion 12 as a pair of end portions opposing to each other in the longitudinal direction, and a back side portion 17 as the first side portion and a front side portion 18 as the second side portion opposing to each other in the width direction. The absorbent article for pet 1 is worn in a state of being wrapped around the pet's waist. The absorbent article for pet 1 is especially preferably used for pet having the urethral opening further toward the front than a position between bases of hind legs (such as miniature dachshund having short legs and a long abdomen).

The back side portion 17 is a side portion positioned on a back side of the pet's body when the absorbent article for pet 1 is put on the pet. The front side portion 18 is a side portion positioned on a front side of the pet's body when the absorbent article for pet 1 is put on the pet.

The absorbent article for pet 1 includes, as shown in FIGS. 1 to 7: a liquid permeable top sheet 2; a back surface sheet 31 and a waterproof sheet 32 constituting a liquid impermeable back surface layer (back sheet 3); an absorbent core 4; a first gather portion 14; a pair of releasably-joined portion 141 formed on the first gather portion 14; a second gather portion 15; a waist gather portion 13; a hook tape 7; and a position mark 8.

The top sheet 2 is configured in a rectangular shape. The top sheet 2 mainly configures a surface of a side to be in contact with the pet's body. As the top sheet 2, a perforated or non-perforated nonwoven fabric can be used. In the first embodiment, the top sheet 2 is preferably constituted of a nonwoven fabric to be engageable with the hook tape 7 (described later). More specifically, as the top sheet 2, a nonwoven fabric having density of preferably $0.05$ g/cm$^3$ to $0.1$ g/cm$^3$, more preferably $0.06$ g/cm$^3$ to $0.08$ g/cm$^3$, can be used, to provide liquid permeability and soft texture.

Figure 4:
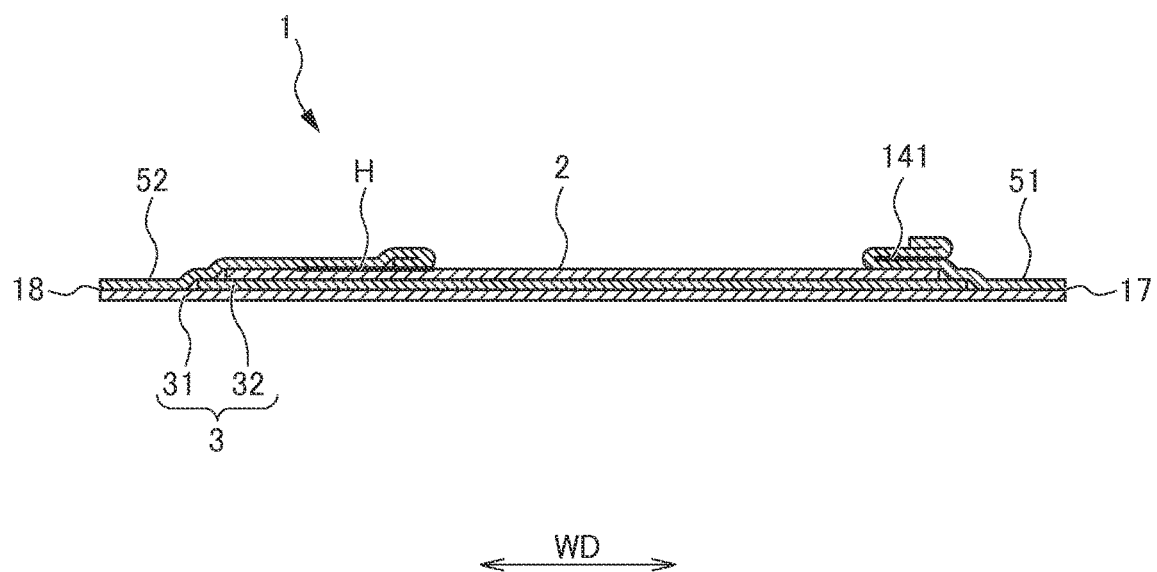
FIG. 4 is a cross-sectional view taken along the line A-A of FIG. 2.
Figure 5:
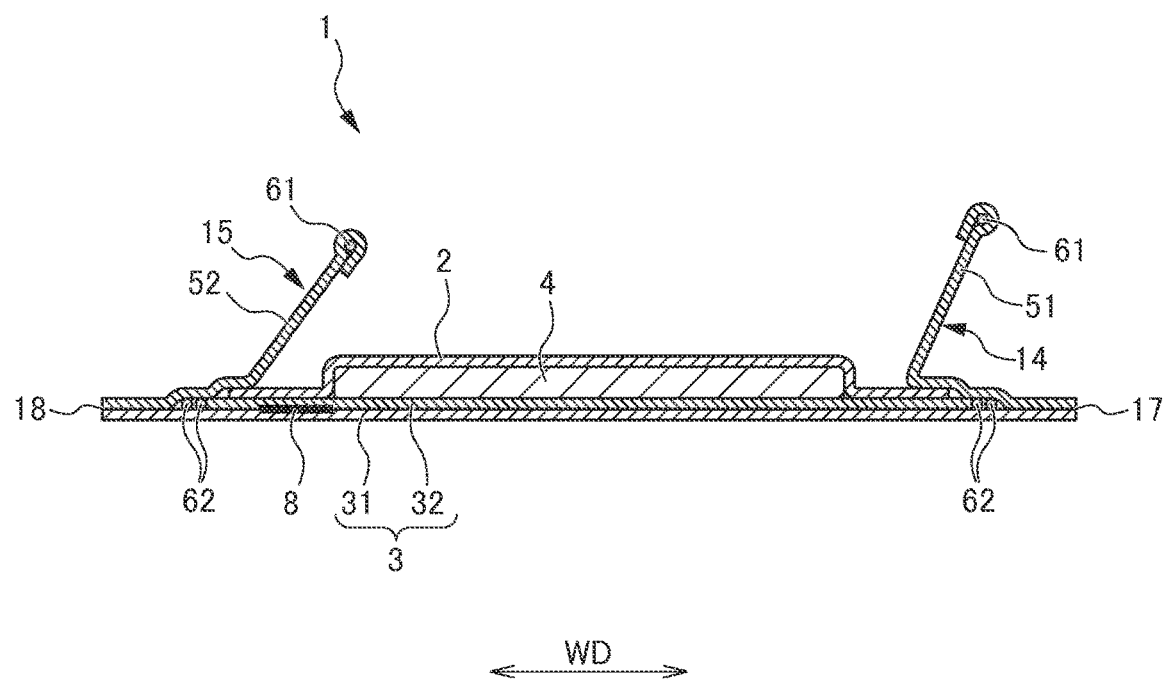
FIG. 5 is a cross-sectional view taken along the line B-B of FIG. 1.
Figure 6:
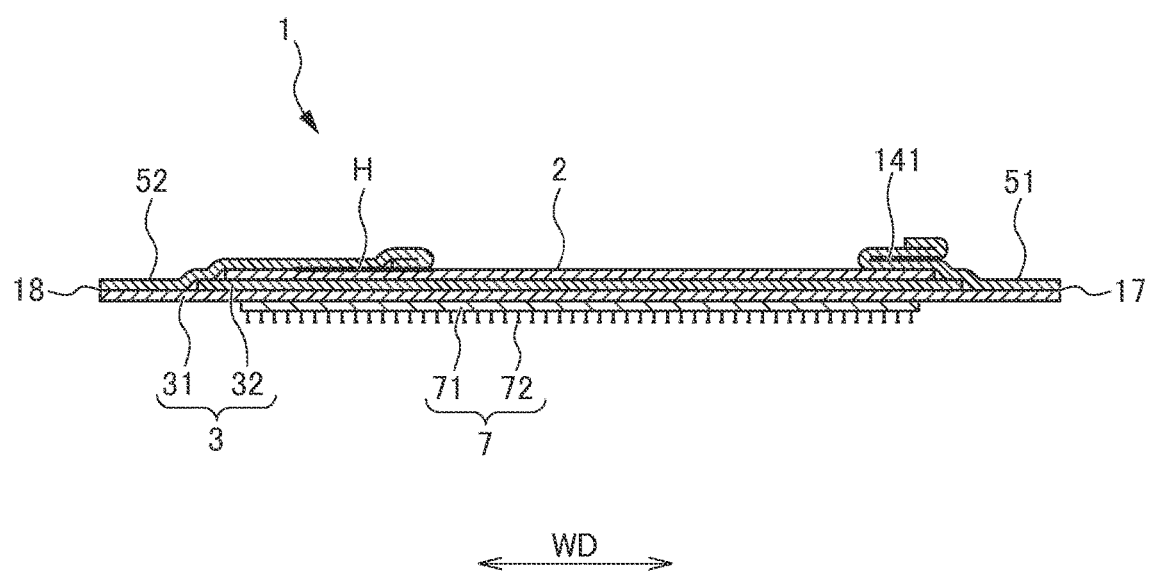
FIG. 6 is a cross-sectional view taken along the line C-C of FIG. 2.

The back surface sheet 31 is configured in a rectangular shape that is wider than, and has substantially the same length as, the top sheet 2, as shown in FIGS. 4 to 6. The back surface sheet 31 configures a surface of the absorbent article for pet 1, on a side not to be in contact with the pet's body.

The waterproof sheet 32 is configured to be smaller in width than the back surface sheet 31 and disposed on a top sheet side of the back surface sheet 31.

As the back surface sheet 31 and the waterproof sheet 32, a hydrophobic nonwoven fabric, a liquid impermeable plastic film, a laminated sheet made of the nonwoven fabric and the liquid impermeable plastic film, an SMS nonwoven fabric made by sandwiching a high-water resistance meltblown nonwoven fabric with a high-strength spun-bond nonwoven fabric, and the like can be used.

The first gather portion 14 is provided on the top sheet side in the back side portion 17 and configured to stand upright from the top sheet 2, as shown in FIGS. 1 to 5. The first gather portion 14 includes the first side sheet 51 and the first elastic member 61.

The first side sheet 51 is configured in an elongated rectangular shape, as shown in FIG. 2. The first side sheet 51 is arranged on a body side of the top sheet 2 in the back side portion 17.

The outer edges of the first side sheet 51 are joined with the side edges of the back surface sheet 31. As shown in FIGS. 4 to 6, the inner edge of the first side sheet 51 is a free end and not joined with the top sheet 2 in an overall length in the longitudinal direction LD of the absorbent article for pet 1.

The first elastic member 61 is disposed in the vicinity of the inner edge of the first side sheet 51, as shown in FIGS. 1 and 2. More specifically, the first elastic member 61 is sandwiched by the first side sheet 51 that is folded back from the inner edge side and fixed to the first side sheet 51 by a hotmelt adhesive (not illustrated) in an extended state as shown in FIG. 5. The first elastic member 61 is, in the extended state, greater in length than the absorbent core 4 in the longitudinal direction LD and is disposed on the first side sheet 51 as shown in FIG. 2. In addition, the first elastic member 61 is not disposed in the vicinity of the first end portion 11 and the second end portion 12.

The pair of releasably-joined portions 141 is formed by releasably joining the first gather portion 14 folded in the width direction WD with itself, in the first end portion 11 and the second end portion 12. More specifically, the inner edge of the first side sheet 51 is folded outward in the width direction WD of the absorbent article for pet 1, in the first end portion 11 and the second end portion 12, as shown in FIGS. 4 and 6. Then, the two layers of the first side sheet 51 thus folded are pressure-bonded, and therefore releasably joined, in the first end portion 11 and the second end portion 12. The pair of releasably-joined portions 141 is thus formed.

The term "releasably-joined" indicates a join with such a strength that the join is maintained when a weak force is applied to a joined part (for example, if a force of developing the folded absorbent article for pet 1 is indirectly applied to the joined part); and that the join is released when a force of a strength greater than a predetermined strength is applied to the joined part (for example, if a force is applied to the joined parts in a direction of releasing the join due to the pet's movement while the joined part is in contact with the pet).

For example, in the present embodiment, joining strength of the joined side sheet 51 (releasably-joined portion) is 0.1 N to 1.5 N.

Here, the joining strength is obtained by the following method. First, a part of the side sheet 51 including a portion which is folded in two layers and pressure-bonded (a portion in which the releasably-joined portion is formed) is cut in a length of 60 mm as a test piece. Next, an end portion of one layer (upper layer) of the two-layered test piece is held by a chuck by 10 mm. The other layer (lower layer) of the two-layered test piece is stuck to a stainless panel with a double-stick tape. The stainless panel is set to a measuring instrument "Autograph" manufactured by Shimadzu Corporation. An end portion of the upper layer of the test piece is peeled from the stainless panel such that the upper layer of test piece makes 135 degrees with respect to the stainless panel. Here, a value upon peeling is measured as the joining strength (N). Peeling of the test piece is performed under conditions of: a distance in a perpendicular direction between the chuck and the lower layer of the test piece of 10 mm; a pulling rate of 300 mm/min; an ambient temperature of 20 degrees centigrade; and relative humidity of 65%.

The second gather portion 15 is provided on the top sheet side in the front side portion 18 and configured to stand upright from the top sheet 2, as shown in FIGS. 1 to 5. The second gather portion 15 includes the second side sheet 52 and the first elastic member 61.

The second side sheet 52 is configured in an elongated rectangular shape, as shown in FIG. 2. The second side sheet 52 is arranged on a body side of the top sheet 2 in the front side portion 18.

The outer edges of the second side sheet 52 are joined with the side edges of the back surface sheet 31. The inner edge of the second side sheet 52 is joined to the top sheet 2 in the first end portion 11 and the second end portion 12, by hotmelt adhesive H as shown in FIGS. 4 and 6. In addition, as shown in FIG. 5, the inner edge of the second side sheet 52 is a free end, except for the first end portion and the second end portion in the longitudinal direction LD of the second side sheet 52 which are joined to the top sheet 2 in the first end portion 11 and the second end portion 12, respectively.

The first elastic member 61 is disposed in the vicinity of the inner edge of the second side sheet 52, as shown in FIGS. 1 and 2. More specifically, the first elastic member 61 is sandwiched by the second side sheet 52 that is folded back from the inner edge side and fixed to the second side sheet 52 by a hotmelt adhesive (not illustrated) in an extended state as shown in FIG. 5. The first elastic member 61 is, in the extended state, greater in length than the absorbent core 4 in the longitudinal direction LD and is disposed on the second side sheet 52 as shown in FIG. 2. In addition, the first elastic member 61 is not disposed in the vicinity of the first end portion 11 and the second end portion 12.

As the first side sheet 51 constituting the first gather portion 14 and the second side sheet 52 constituting the second gather portion 15, a liquid repellent or hydrophobic material is preferably used. More specifically, various nonwoven fabrics, such as spun lace nonwoven fabric, spun bond nonwoven fabric, thermal bond nonwoven fabric, melt-blown nonwoven fabric, needle-punched nonwoven fabric, air-through nonwoven fabric and the like can be used as the first gather portion 14 and the second gather portion 15. As the fiber constituting the nonwoven fabric, synthetic fiber of olefin, polyester, polyamide and the like, such as polyethylene and polypropylene; regenerated fiber, such as rayon and cupra; and natural fiber, such as cotton can be used.

In the first embodiment, the first side sheet 51 is preferably constituted of a material having a greater density than the nonwoven fabric constituting the top sheet 2 for forming the releasably-joined portion 141 by pressure bonding in a manufacturing process described later. More specifically, the density of the first side sheet 51 is preferably 0.09 g/cm$^3$ to 0.15 g/cm$^3$, and more preferably 0.1 g/cm$^3$ to 0.13 g/cm$^3$. Here, the density of each of the top sheet 2 and the first side sheet 51 is obtained as follows. First, each nonwoven fabric is cut into a 10×10 cm sample. The weight and thickness of the sample under no load is measured at an ambient temperature of 20 degrees centigrade and relative humidity of 65%. The values of the weight and the thickness are obtained respectively by averaging values obtained from the measurement of weight and thickness of ten samples.

As the first elastic member 61, any material that is elongated and stretchable can be used, for example: natural rubber, such as filiform rubber and flat rubber; thermoplastic elastomer, such as urethane, ethylene-vinyl acetate copolymer (EVA), and PE. More specifically, as the thermoplastic elastomer, polybutadiene, polyisoprene, styrene-butadiene copolymer, styrene-isoprene copolymer, polyurethane, ethylene-vinyl acetate copolymer, ethylene-alpha-olefin copolymer and the like that are processed to be filiform or formed in a film and then slitted into thin strips can be exemplified.

As shown in FIG. 1, the waist gather portion 13 is provided on each of the back side portion 17 and the front side portion 18. The waist gather portion 13 includes the second elastic member 62 disposed in the back side portion 17 and the front side portion 18. The second elastic member 62 is disposed between the first side sheet 51 and the back surface sheet 31, and between the second side sheet 52 and the back surface sheet 31, as shown in FIG. 5. In addition, the second elastic member 62 is fixed to the first side sheets 51 and the back surface sheet 31, as well as to the second side sheet 52 and the back surface sheet 31 by a hotmelt adhesive.

The second elastic member 62 is, in the extended state, greater in length than the absorbent core 4 in the longitudinal direction and is disposed in each of the front side portion 18 and the back side portion 17.

As the second elastic member 62, the same material as of the first elastic member 61 can be used.

Figure 3:
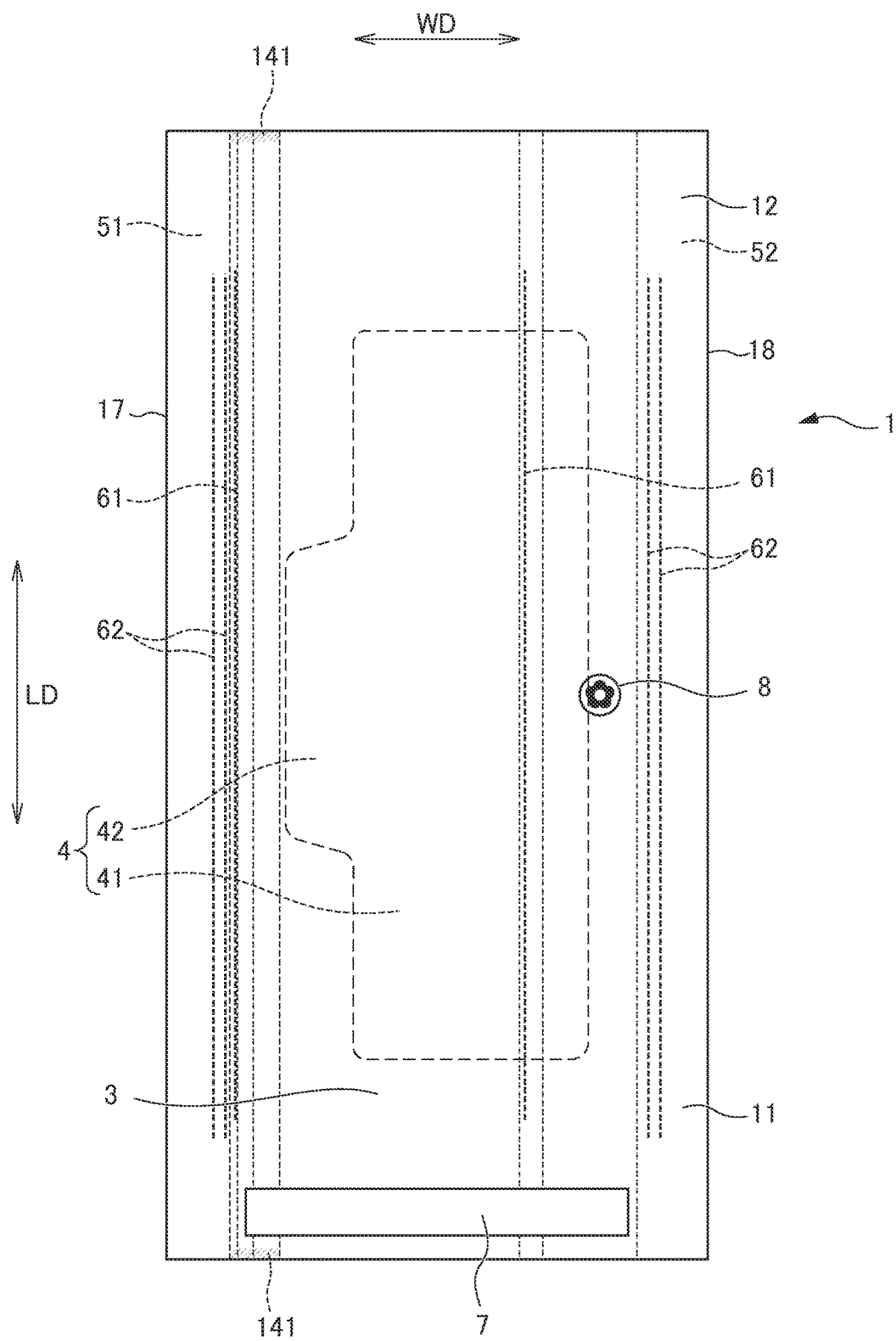
FIG. 3 is a plan view of the absorbent article for pet according to the first embodiment, as viewed from a back surface layer side.
Figure 7:
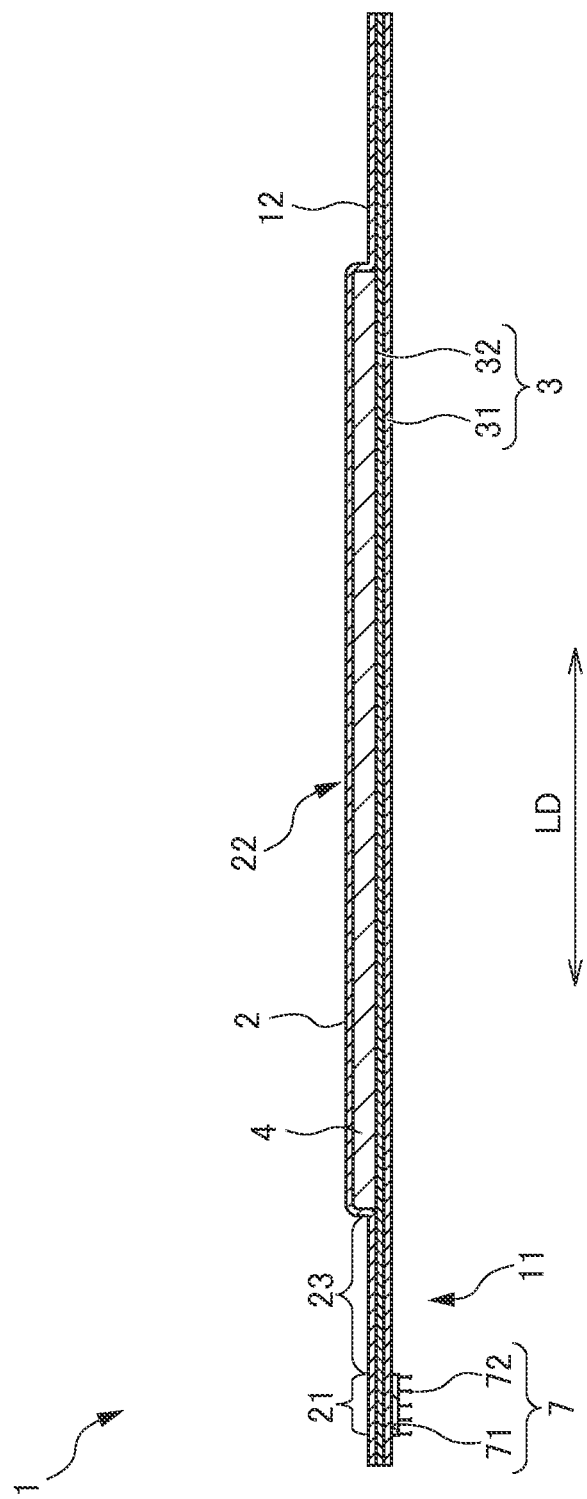
FIG. 7 is a cross-sectional view taken along the line D-D of FIG. 2.

The absorbent core 4 is disposed between the top sheet 2 and the back surface layer (back sheet) 3 that are layered, as shown in FIGS. 5 and 7. The absorbent core 4 includes a rectangular belt shaped absorbent core main body 41 and a first extension portion 42 that extends from the absorbent core main body 41, as shown in FIGS. 2 and 3.

The absorbent core main body 41 is disposed to extend in the longitudinal direction of the absorbent article for pet 1.

The absorbent core main body 41 is configured to be smaller in length than the top sheet 2 and the back surface sheet 31, as shown in FIG. 7. The absorbent core main body 41 is not disposed in the vicinity of the first end portion 11 and the second end portion 12.

A width of the absorbent core main body 41 is configured to be smaller than a width of the top sheet 2 and the back surface sheet 31. The absorbent core main body 41 is disposed disproportionately toward the second side sheet 52 (i.e., toward the front side portion 18) in the width direction WD of the absorbent article for pet 1.

The first extension portion 42 extends outward in the width direction from a central portion of the absorbent core main body 41 in the longitudinal direction. More specifically, the first extension portion 42 is disposed on a side on which the first side sheet 51 is disposed, out of two sides along the longitudinal direction of the absorbent core main body 41. A length L1 of the first extension portion 42 in the longitudinal direction LD of the absorbent article for pet 1 is preferably 150 mm to 600 mm, or 30% to 90% of the length of the absorbent article for pet 1, for appropriately covering a lower face of the urinary organ of the pet. A width W1 of the first extension portion 42 in the width direction WD of the absorbent article for pet 1 is preferably 10 mm to 100 mm, or 10% to 50% of the width of the absorbent core 4, for appropriately covering a base of the urinary organ of the pet.

When the first extension portion 42 is in a shape smoothly projecting from the absorbent article main body 41 as shown in FIG. 18, the length L1 of the first extension portion 42 in the longitudinal direction LD of the absorbent article for pet 1 is calculated as follows.

Wn is a width of the narrowest part of the absorbent core 4; Ww is a width of the widest part of the absorbent core 4; Wav is a calculated width of the extension portion obtained by averaging the width Wn and Ww, i.e., Wav=(Wn+Ww/2). Then, a length in the longitudinal direction LD between two positions having the calculated width Wav in the absorbent core 4 is considered to be the length L1 of the first extension portion 42 in the longitudinal direction LD of the absorbent article for pet 1.

As the absorbent core 4, fluff pulp and high absorbance polymer wrapped with a core wrapping material, such as tissue can be used.

As the fluff pulp used in the absorbent core 4, chemical pulp, cellulose fiber, and artificial cellulose fiber, such as rayon, acetate, and the like can be exemplified. As the high absorbance polymer, granulous or fibrous polymer of starch, acrylic acid, and amino acid can be exemplified.

The hook tape 7 is disposed on an outer face of the first end portion 11 of the absorbent article for pet 1, as shown in FIGS. 1 to 3. The hook tape 7 is configured in a rectangular shape and disposed such that the longitudinal direction thereof is along the width direction WD of the absorbent article for pet 1. In addition, the hook tape 7 is attached to a position spaced apart from the side edge of the first end portion 11 by a predetermined distance.

As shown in FIG. 6, the hook tape 7 includes a base portion 71 and a plurality of hook portions 72 provided on one face of the base portion 71. The hook tape 7 is attached to the back surface sheet 31 such that the face on which the plurality of hook portions 72 are formed is directed outward.

The position mark 8 indicates a position used as an index during putting the absorbent article for pet 1 on the pet. In the first embodiment, the position mark 8 is disposed on an outer side of the back surface layer 3, as shown in FIG. 3. The position mark 8 is disposed on a side on which the second side sheet 52 is disposed (i.e., the front side portion side) in the width direction WD, and also in a central portion of the absorbent article for pet 1 in the longitudinal direction LD. In the first embodiment, the position mark 8 indicates a part that should be positioned on a front side of the pet's body upon putting the absorbent article for pet 1 on the pet.

In the first embodiment, the position mark 8 is configured of a sticker member having adhesive with a flower pattern and disposed between the waterproof sheet 32 and the back surface sheet 31 (see FIG. 5). The position mark 8 is visible from an outer side of the back surface layer 3, through the back surface sheet 31.

With the position mark 8, it is easy to understand which side portion of the absorbent article for pet 1 should be positioned on the front side of the pet's body, even when the absorbent article for pet 1 is viewed from the back surface layer side.

The position mark 8 can be configured of a material that changes in color when the absorbent core 4 that is disposed at the position of the position mark 8 absorbs moisture. By checking the color of the position mark 8, time to replace the absorbent article for pet 1 can be recognized appropriately.

Alternatively, the position mark 8 can be printed on the outer side of the back surface layer 3.

In the above-described absorbent article for pet 1, the first elastic member 61 in the extended state is fixed to the first side sheet 51 and the second side sheet 52 along the longitudinal direction LD of the absorbent article for pet 1. In addition, the second elastic member 62 in the extended state is fixed between the first side sheet 51 and the back surface sheet 31, as well as between the second side sheet 52 and the back surface sheet 31, along the longitudinal direction LD of the absorbent article for pet 1.

Given this, the absorbent article for pet 1 in a natural state (without external force applied) has a three-dimensional shape as shown in FIG. 1, with the first elastic member 61 and the second elastic member 62 being contracted to thereby bring the first end portion 11 and the second end portion 12 close to each other, with the top sheet side forming an inner surface. A pair of waist gather portions 13 that are stretchable in the longitudinal direction LD are thus formed in the back side portion 17 and the front side portion 18 (see FIG. 1).

In addition, on the free ends of the first side sheet 51 and the second side sheet 52, mainly a portion, in which the first elastic member 61 is arranged, lift. The first gather portion 14 and the second gather portion 15 are thus formed (see FIG. 5).

Here, the inner edge of the first side sheet 51 constituting the first gather portion 14 is not joined with the top sheet 2 in an overall length in the longitudinal direction LD of the absorbent article for pet 1. In addition, the inner edge of the first side sheet 51 is folded outward in the width direction WD of the absorbent article for pet 1, and the layers of the first side sheet 51 thus folded are releasably joined at the releasably-joined portions 141, in the first end portion 11 and the second end portion 12, as shown in FIGS. 4 and 6. As a result, the first gather portion 14 is configured to be easy to lie outwardly in the width direction WD of the absorbent article for pet 1, in a state in which the absorbent article for pet 1 is developed (see FIG. 5).

On the other hand, the inner edge of the second side sheet 52 constituting the second gather portion 15 is joined with the top sheet 2 in the first end portion 11 and the second end portion 12, whereas a remainder of the inner edge of the second side sheet 52 outside the first end portion 11 and the second end portion 12 is configured to be a free end. As a result, the second gather portion 15 is configured to be easy to incline inwardly in the width direction WD of the absorbent article for pet 1, in a state in which the absorbent article for pet 1 is developed.

Figure 8:
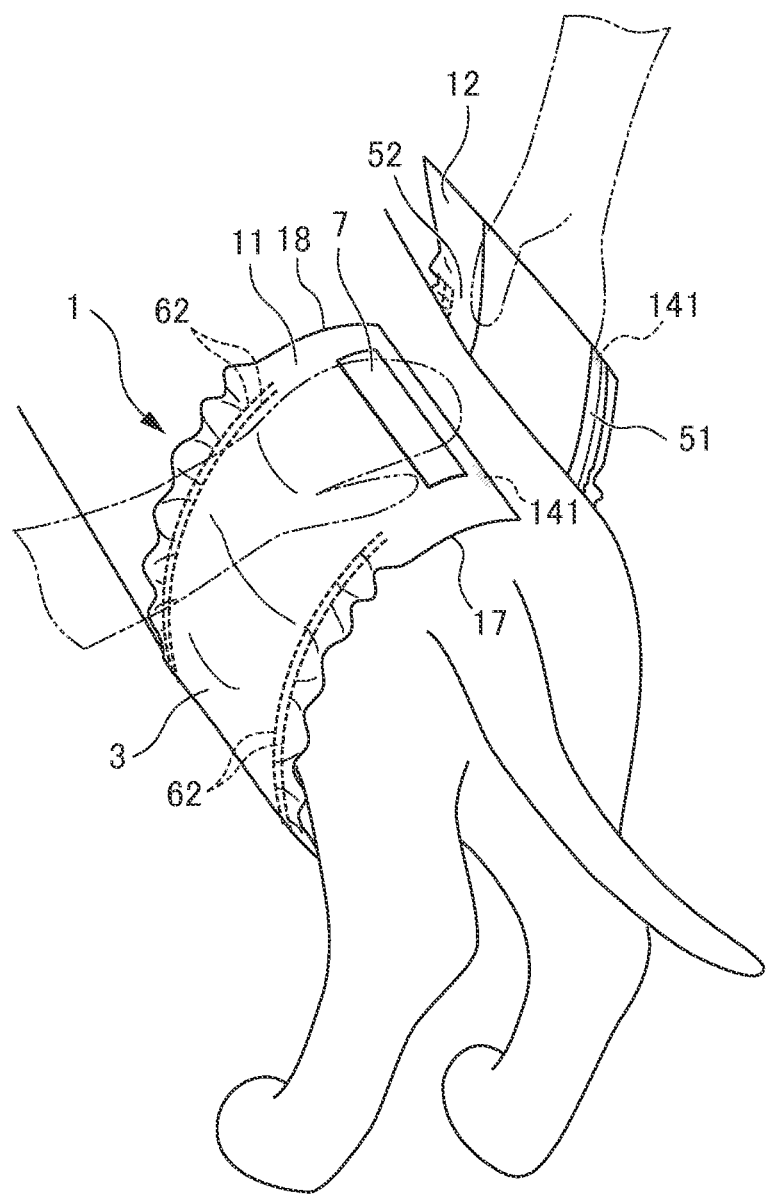
FIG. 8 is a diagram illustrating a process of putting the absorbent article for pet on a pet, in which the first end portion is placed on the pet's back.
Figure 9:
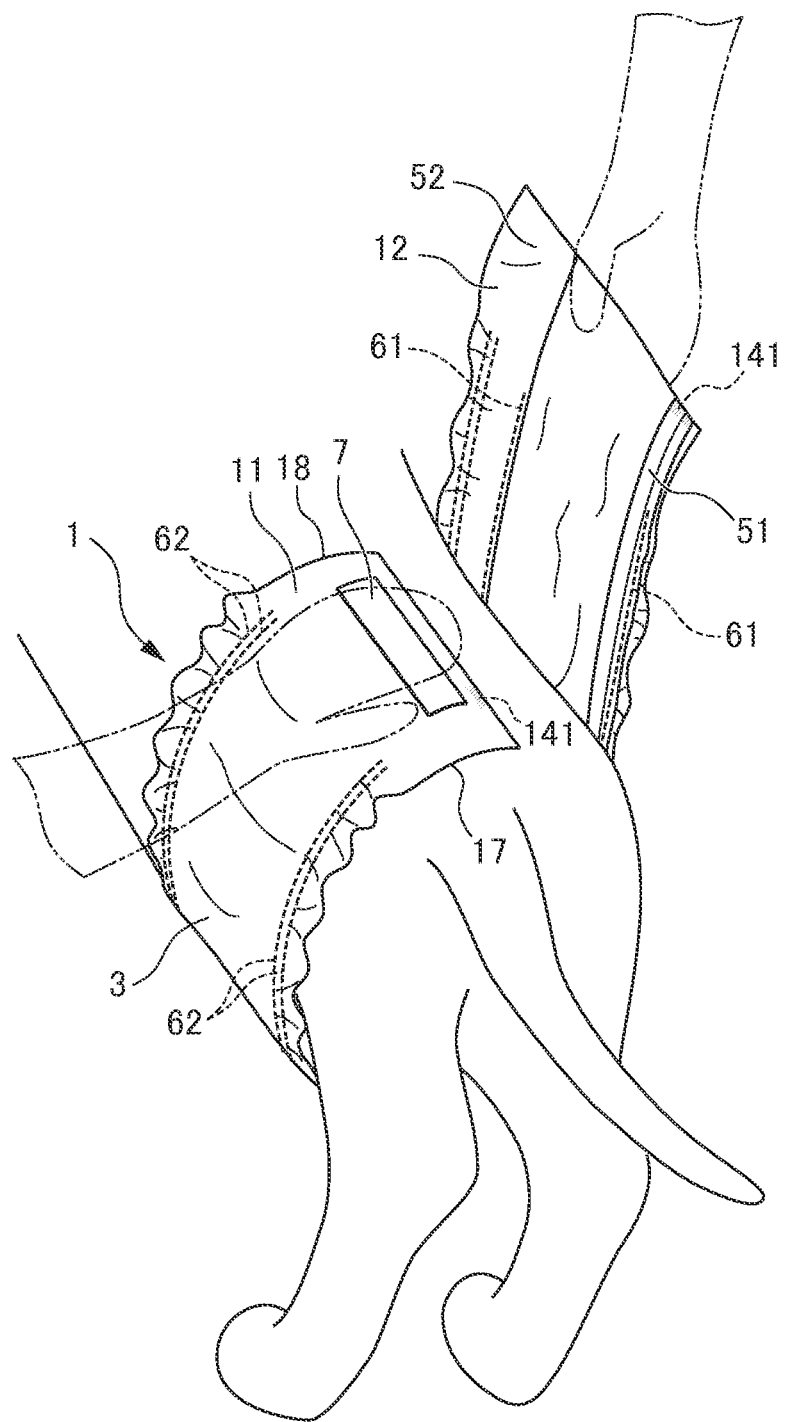
FIG. 9 is a diagram illustrating a process of putting the absorbent article for pet on a pet, in which the second end portion of the absorbent article for pet is pulled to bring the absorbent article for pet into close contact with the waist of the pet.
Figure 10:
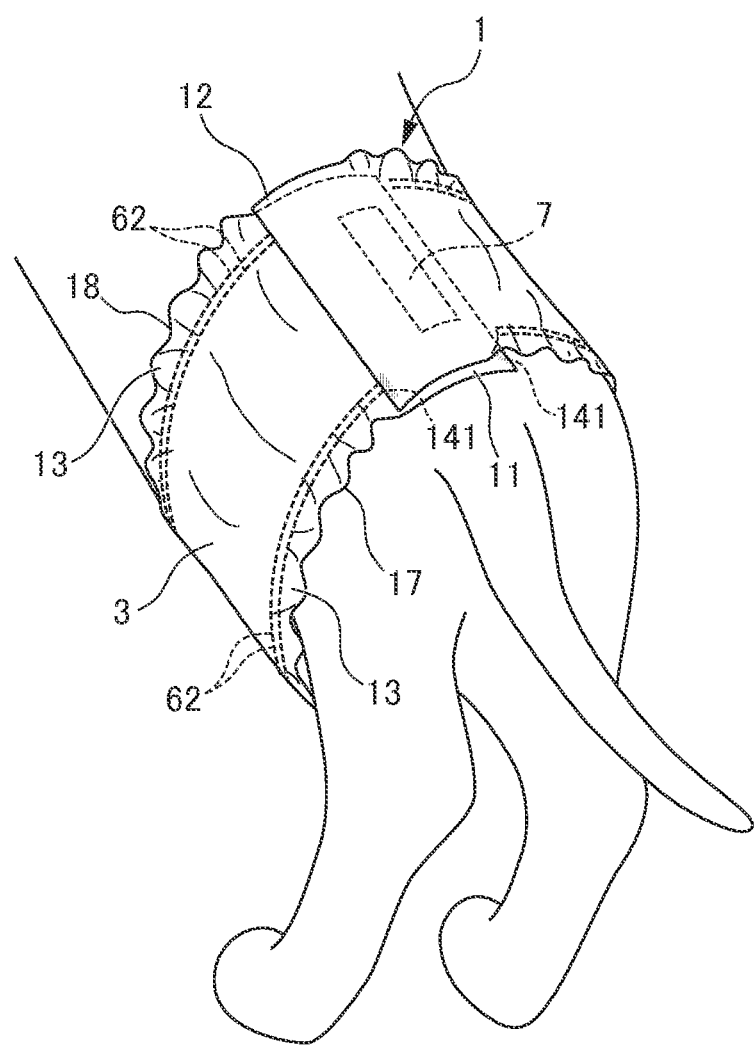
FIG. 10 is a diagram illustrating a state in which the absorbent article for pet is put around the pet's waist.
Figure 11:
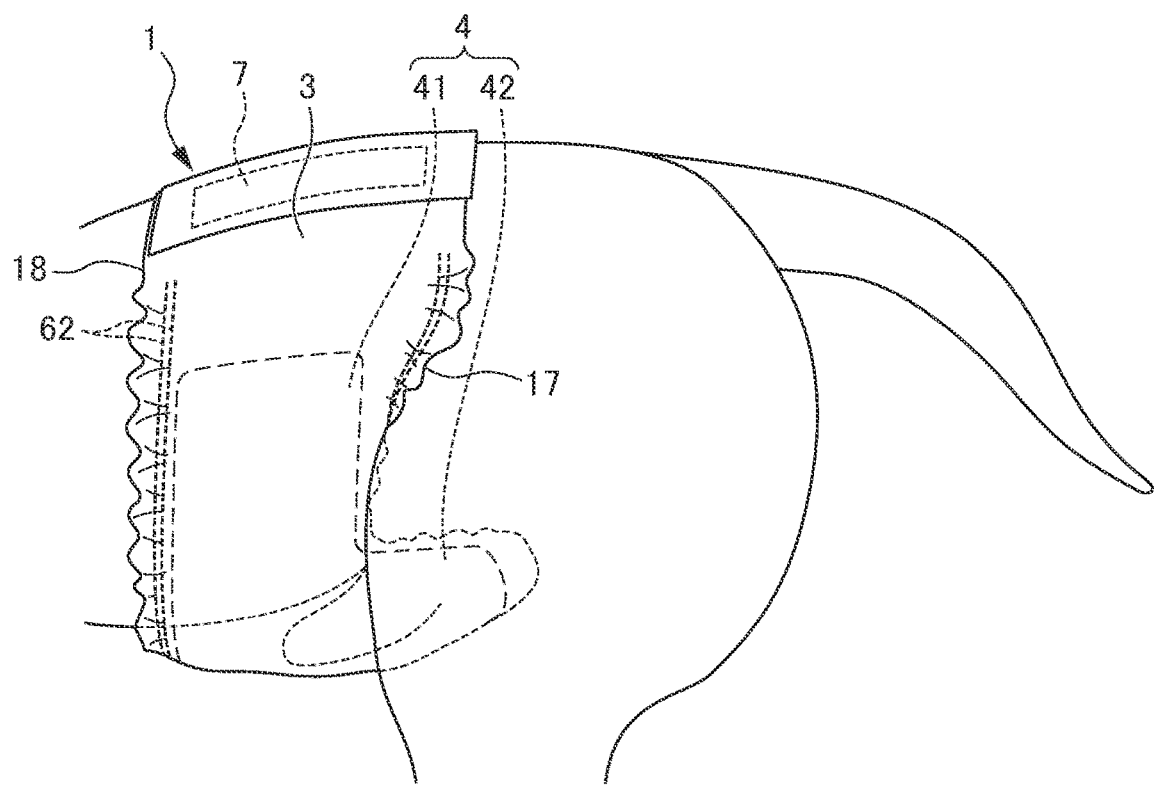
FIG. 11 is a diagram illustrating a state in which the absorbent article for pet is put around the pet's waist, as viewed from a left side of the pet.

Next, steps of putting the absorbent article for pet 1 according to the first embodiment on a pet will be described hereinafter with reference to FIGS. 8 to 11. FIGS. 8 to 11 are diagrams illustrating a process of putting the absorbent article for pet 1 on a pet: FIG. 8 is a diagram illustrating a state in which the first end portion 11 is placed on the pet's back; FIG. 9 is a diagram illustrating a process of putting the absorbent article for pet 1 on a pet, in which the second end portion 12 of the absorbent article for pet 1 wrapped around the waist of the pet is pulled to bring the absorbent article for pet 1 into close contact with the waist of the pet; FIG. 10 is a diagram illustrating a state in which the absorbent article for pet 1 is put around the pet's waist; and FIG. 11 is a diagram illustrating a state in which the absorbent article for pet 1 is put around the pet's waist, as viewed from a left side of the pet.

First, as shown in FIG. 8, the first end portion 11 of the absorbent article for pet 1 is placed on the back of the pet and the vicinity of the first end portion 11 is held by one hand of a user. Here, a side on which the position mark 8 is provided is placed on the front side of the pet's body. In the first end portion 11 and the second end portion 12 of the first side sheet 51, the releasably-joined portion 141 is formed. As a result, the first gather portion 14 is brought into contact with the pet's body in a state of lying outward in the width direction WD of the absorbent article for pet 1 (i.e., toward the back side of the pet's body).

Thereafter, in a state in which the first end portion 11 is held by one hand, the second end portion 12 of the absorbent article for pet 1 is held by the other hand and wrapped around the pet's body to cover the abdomen of the pet.

Next, as shown in FIG. 9, the second end portion 12 is pulled upward and the pair of waist gather portions 13 is brought into close contact with the pet's waist; and then, as shown in FIG. 10, the inner face of the second end portion 12 is engaged with the hook tape 7 provided on the outer face of the first end portion 11. The absorbent article for pet 1 is thus wrapped around the pet's waist in a state in which the first gather portion 14 lies outward.

In the abovementioned process, upon putting the absorbent article for pet 1 on the pet, the absorbent article for pet 1 is brought close to the hind leg side of the pet's body and wrapped around the pet's body, so as to cover the entire urinary organ of the pet by the absorbent core 4. In the first embodiment, the absorbent core main body 41 is disposed disproportionately toward the second side sheet 52 (i.e., toward the front side of the pet's body) in the width direction WD of the absorbent article for pet 1. In addition, the first extension portion 42 extends outward in the width direction WD of the absorbent article for pet 1 (i.e., toward the back side of the pet's body). The first extension portion 42 can thus be disposed to cover a lower portion of the base of the pet's urinary organ, positioned between the hind legs, as shown in FIG. 11. In addition, the absorbent core main body 41 is not provided in a part of the absorbent article for pet 1 disposed close to the pet's hind legs. In addition, since the absorbent core 4 (the absorbent core main body 41) does not interfere with the pet's hind legs, when the absorbent article for pet 1 is wrapped around the pet's body, the absorbent article for pet 1 can be appropriately wrapped around the pet's body at a position close to the hind legs.

Next, a manufacturing method of the absorbent article for pet 1 according to the first embodiment will be described hereinafter with reference to FIGS. 12 to 15. FIGS. 12A to 15A are plan views illustrating steps in the manufacturing method of the absorbent article for pet 1, and FIGS. 12B to 15B are cross-sectional views illustrating the parts corresponding to the first end portion 11 and the second end portion 12 in the steps.

The manufacturing method of the absorbent article for pet 1 includes a continuous body forming step S1, a first folding step S2, a cutting step S3, and a second-folding step S4.

Figure 12B:
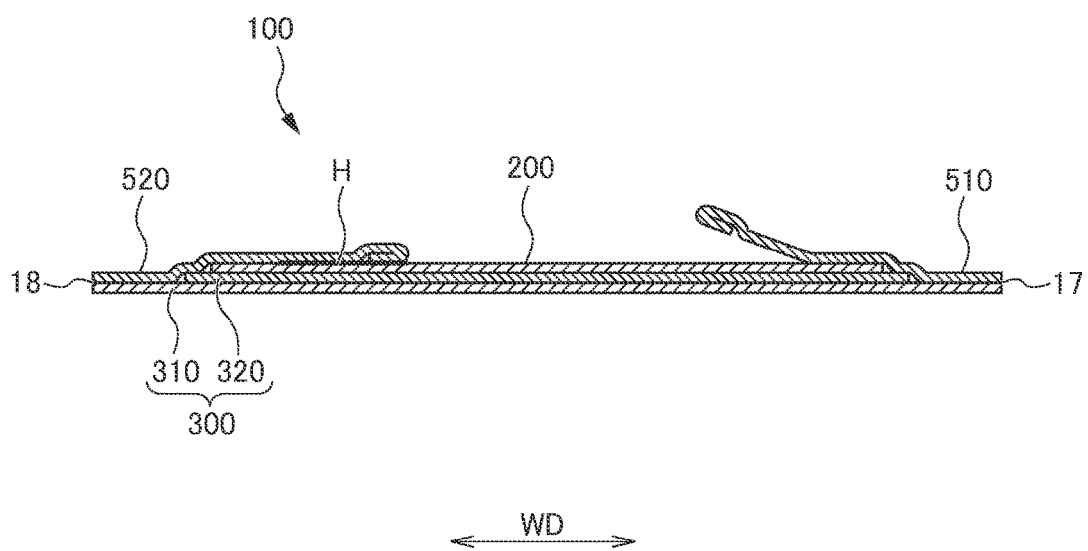
FIG. 12B is a cross-sectional view taken along the line E-E of FIG. 12A.

In the continuous body forming step S1, a continuous body 100 for forming the absorbent article for pet 1 is formed. More specifically, in the continuous body forming step S1, a plurality of absorbent cores 4 is disposed at predetermined intervals in the longitudinal direction, between a continuous top sheet 200 and a continuous back surface layer 300, as shown in FIGS. 12A and 12B. A continuous first side sheet 510 and a continuous second side sheet 520 are disposed on two sides of the continuous top sheet 200. In addition, in the continuous body forming step S1, outer side portions of the continuous first side sheet 510 and outer side portions of the continuous second side sheet 520 are joined with outer side portions of the continuous back surface layer 300 and outer side portions of the continuous top sheet 200, as shown in FIGS. 12A and 12B. Furthermore, in the continuous body forming step S1, an inner portion of the continuous second side sheet 520 and the continuous top sheet 200 are joined by hotmelt adhesive H in the vicinity of a position at which the continuous body is to be cut in the cutting step S3 (described later).

Figure 13B:
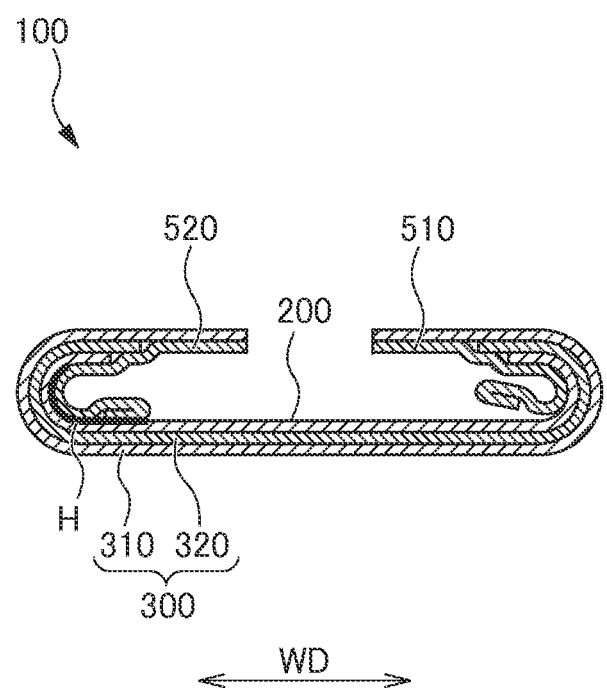
FIG. 13B is a cross-sectional view taken along the line F-F of FIG. 13A.

In the first folding step S2, as shown in FIGS. 13A and 13B, the two sides of the continuous body 100 is folded back toward the continuous top sheet 200, such that the continuous first side sheet 510 and the continuous second side sheet 520 are folded back in the width direction. More specifically, a first side 17 of the continuous body 100 on which the continuous first side sheet 510 is disposed, is folded back toward the continuous top sheet 200, along a folding line substantially corresponding to a position of an extended end of the first extension portion 42. In addition, a second side 18 of the continuous body 100 on which the continuous second side sheet 520 is disposed, is folded back toward the continuous top sheet 200, along a folding line substantially corresponding to a side edge along the longitudinal direction of the absorbent core main body 41.

In the cutting step S3, the continuous body 100 that is folded back in the fist folding step S2 is cut in the width direction at predetermined intervals in the longitudinal direction. More specifically, in the cutting step S3, the continuous body 100 is cut by a cutter in a position at which the inner portion of the continuous second side sheet 520 and the continuous top sheet 200 are joined in the continuous body forming step S1. In the cutting step S3, the layers of the continuous first side sheet 510 that is folded back in the first folding step S2 are disposed one on top another in a thickness direction of the continuous body 100 and pressured in the thickness direction during cutting by the cutter. The layers of the continuous first side sheet 510 that is folded back is thus releasably joined by pressure bonding at the position cut by the cutter, thereby forming the releasably joined portion 141.

In the second folding step S4, the absorbent article for pet formed by cutting in the cutting step S3 is double-folded in the longitudinal direction such that the top sheet 2 faces itself.

The absorbent article for pet 1 that is double-folded in the second folding step S4 is packed in a package bag in a state in which a plurality of the absorbent articles for pet 1 is stacked (not illustrated).

Figure 14A:
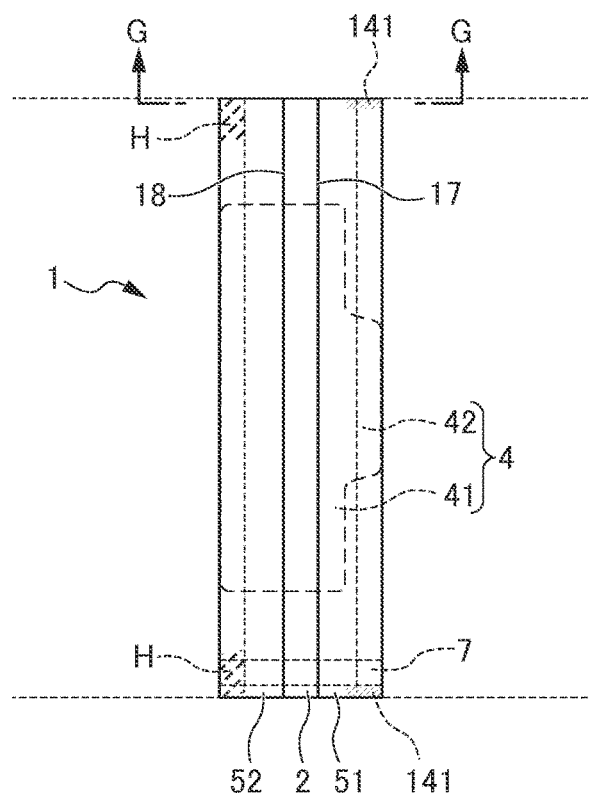
FIG. 14A is a plan view illustrating a cutting in the manufacturing method of the absorbent article for pet according to the first embodiment.
Figure 14B:
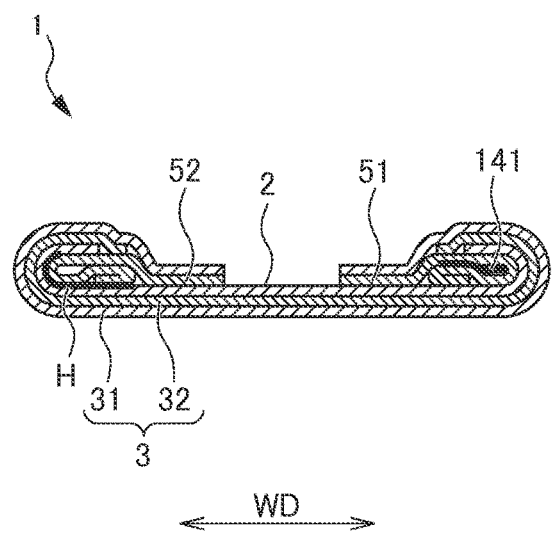
FIG. 14B is a cross-sectional view taken along the line G-G of FIG. 14A.
Figure 15A:
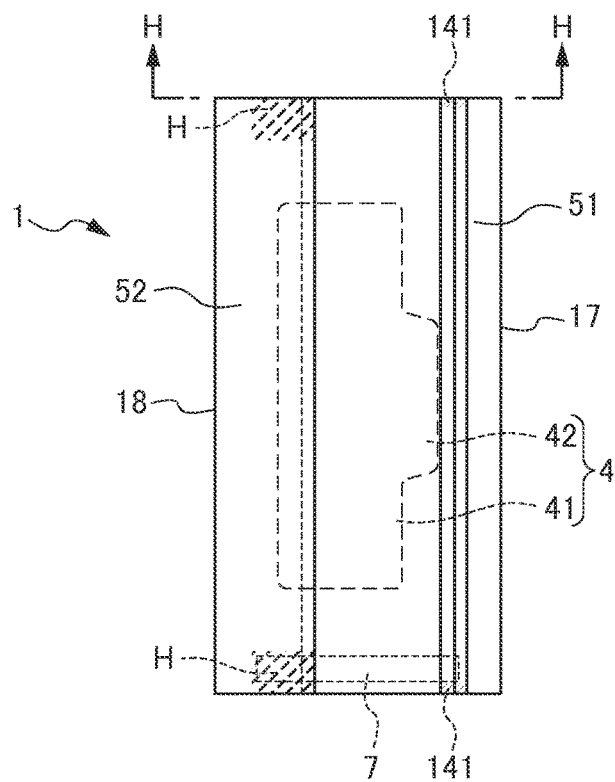
FIG. 15A is a plan view illustrating a state in which two sides of the absorbent article for pet obtained by cutting in the cutting step are unfolded.
Figure 15B:
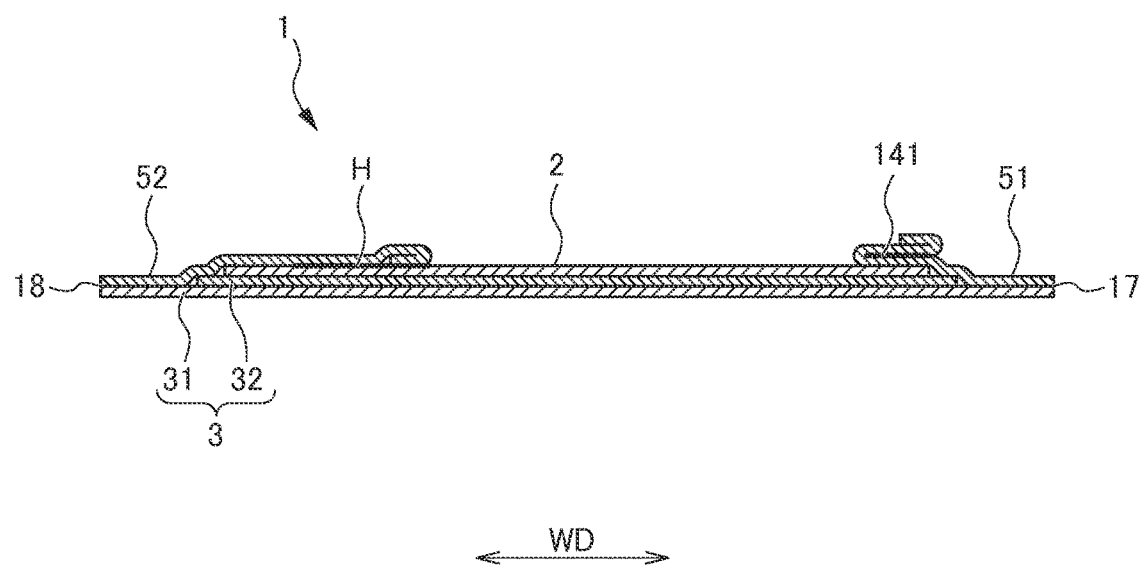
FIG. 15B is a cross-sectional view taken along the line H-H of FIG. 15A.

To use the absorbent article for pet 1 manufactured by the above-described manufacturing method and packed in a state of being folded, first, the double-folded absorbent article for pet 1 is opened (see FIGS. 14A and 14B). And then, the back side portion 17 and the front side portion 18 that are folded back in the width direction is opened outward as shown in FIGS. 15A and 15B. As a result, since the first side sheet 51 has the releasably-joined portion 141 formed in the first end portion 11 and the second end portion 12, an operation of opening up the back side portion 17 opens also the inner edge of the first side sheet 51. In a state in which the absorbent article for pet 1 is developed, the first gather portion 14 that includes the first side sheet 51 remains to lie outward.

In the above-described cutting step S3, the layers of the continuous second side sheet 520 is also releasably joined to itself in a state of being folded in the width direction by pressure bonding at the position cut by the cutter. However, in the parts that are releasably joined in the continuous second side sheet 520 (i.e., in the first end portion 11 and the second end portion 12), the continuous second side sheet 520 and the continuous top sheet 200 are also joined by hotmelt adhesive which has a higher joining strength than the pressure bonding. The join of the inner portion of the continuous second side sheet 520 with the continuous top sheet 200 has a higher joining strength than the releasably-joined portions of the continuous second side sheet 520, thereby permitting the releasably-joined portions of the second side sheet 52 to be released when the absorbent article for pet 1 is opened outwardly. That is, the releasable join is released by an operation of opening the front side portion 18 outward upon using the absorbent article for pet 1 (see FIGS. 15A and 15B). In other words, the releasably-joined portion 141 is not maintained in the second side sheet 52 when the absorbent article for pet 1 is developed.

The above-described absorbent article for pet 1 according to the first embodiment and the manufacturing method of the absorbent article for pet 1 provide the following operation and effects.

(1) The absorbent article for pet 1 includes the pair of releasably-joined portions 141 that is formed by releasably joining the first gather portion 14 in a state of being folded outward in the width direction WD in the first end portion 11 and the second end portion 12. As a result, the first gather portion 14 can be made easier to lie outward in the width direction WD of the absorbent article for pet 1. Therefore, when the absorbent article for pet 1 is wrapped around the pet's body, the first gather portion 14 (the first side sheet 51) in a state of lying outward can be arranged to appropriately cover the lower part and back part of the base of the pet's urinary organ. As a result, the absorbent article for pet 1 can be put on without applying an intense stress to the base of the pet's urinary organ and the pet will be unlikely physically stressed.

The releasably-joined portion 141 is configured with such a joining strength that the join is released when a force of a strength greater than a predetermined strength is applied to the joined part (for example, if a force is applied to the joined part in a direction of releasing the join due to the pet's movement while the joined part is in contact with the pet). As a result, if a force is applied to the releasably-joined portion in a direction of releasing the joining due to the pet's movement after putting the absorbent article for pet 1 on the pet, the join of the releasably-joined portion 141 can be easily released. Therefore, after putting the absorbent article for pet 1 on the pet, the join of the releasably-joined portion 141 can be easily released, thereby improving adherence of the first gather portion 14 to the pet's body.

(2) The inner edge of the second side sheet 52 constituting the second gather portion 15 is joined to the top sheet 2 in the first end portion 11 and the second end portion 12 of the absorbent article for pet 1. The inner edge of the second side sheet 52, which is an upright edge of the second gather portion 15, can thus be fixed in a state of being directed inward in the width direction WD of the absorbent article for pet 1 (i.e., toward the back side of the pet's body), in the first end portion 11 and the second end portion 12. Since the second gather portion 15 can be made easy to lie inward in the width direction of the absorbent article for pet 1, leakage of urine from the front side of the pet's body can be effectively prevented.

When the absorbent article for pet 1 is put on a male pet, a top of the sex organ extending to the front side of the body can be appropriately covered by the second gather portion 15 that can easily lie inward (i.e., toward the back side of the pet's body). Therefore, leakage of urine from the front side of the pet's body can be prevented more effectively. In addition, since the top of the sex organ is in contact with the second gather portion 15, the dislocation of the absorbent article for pet 1 toward the back side of the body can be prevented.

(3) The first gather portion 14 includes the first side sheet 51 and the first elastic member 61, and the second gather portion 15 includes the second side sheet 52 and the first elastic member 61. The first gather portion 14 and the second gather portion 15 can thus be appropriately upright from the top sheet 2.

(4) The absorbent core main body 41 is disposed disproportionately toward the second side sheet 52 (i.e., toward the front side of the pet's body) in the width direction WD of the absorbent article for pet 1, and the first extension portion 42 extends outward in the width direction WD of the absorbent article for pet 1 (i.e., toward the back side of the pet's body). The first extension portion 42 can thus be disposed to cover a lower portion of the base of the pet's urinary organ, positioned between the hind legs. In addition, the absorbent core main body 41 is not provided in a part of the absorbent article for pet 1 disposed close to the pet's hind legs. In addition, since the absorbent core 4 (the absorbent core main body 41) does not interfere with the pet's hind legs when the absorbent article for pet 1 is wrapped around the pet's body, the absorbent article for pet 1 can be appropriately wrapped around the pet's body at a position close to the hind legs. In other words, in the absorbent article for pet that is used in a state of being wrapped around the pet's waist, the absorbent core 4 can appropriately cover the entire urinary organ.

(5) The absorbent core main body 41 is disposed to extend in the longitudinal direction LD of the absorbent article for pet 1. As a result, when the absorbent article for pet 1 is put on a pet, the absorbent core main body 41 can be arranged also in side portions of the pet's body, except for a part between the hind legs in which the first extension portion 42 is provided. Therefore, even if the pet urinates while lying down, urine can be appropriately absorbed by the absorbent core main body 41 disposed on the side portions of the pet's body.

(6) The position mark 8 indicating a part that is to be positioned on the front side of the pet's body is provided at a position visible from the outside of the back surface layer 3. It is thus easy to understand which side portion of the absorbent article for pet 1 is to be positioned on the front side of the pet's body, even when the absorbent article for pet 1 is viewed from the back surface layer side.

(7) The manufacturing method of the absorbent article for pet 1 includes: the first folding step S2 of folding the sides of the continuous body 100 for forming the absorbent article for pet toward the continuous top sheet 200, such that the continuous first side sheet 510 and the continuous second side sheet 520 are folded back in the width direction; and the cutting step S3 of cutting the continuous body 100 after the first folding step S2 at predetermined intervals in the longitudinal direction, in which the pair of releasably-joined portion 141 is formed in the cutting step S3. Since the releasably-joined portion 141 can be formed without providing a separate step, the absorbent article for pet 1 with the releasably-joined portion 141 can be manufactured without making the manufacturing process of the absorbent article for pet 1 complex.

(8) The first side sheet 51 is constituted of a material having a greater density than the top sheet 2. As a result, a joining force between two layers of the first side sheet 51 can be made greater than a joining force between the top sheet 2 and the first side sheet 51 disposed one on top another, when the pressure bonding is performed with the same intensity. Therefore, the pair of releasably-joined portion 141 can be more reliably formed in the cutting step S3.

Figure 16:
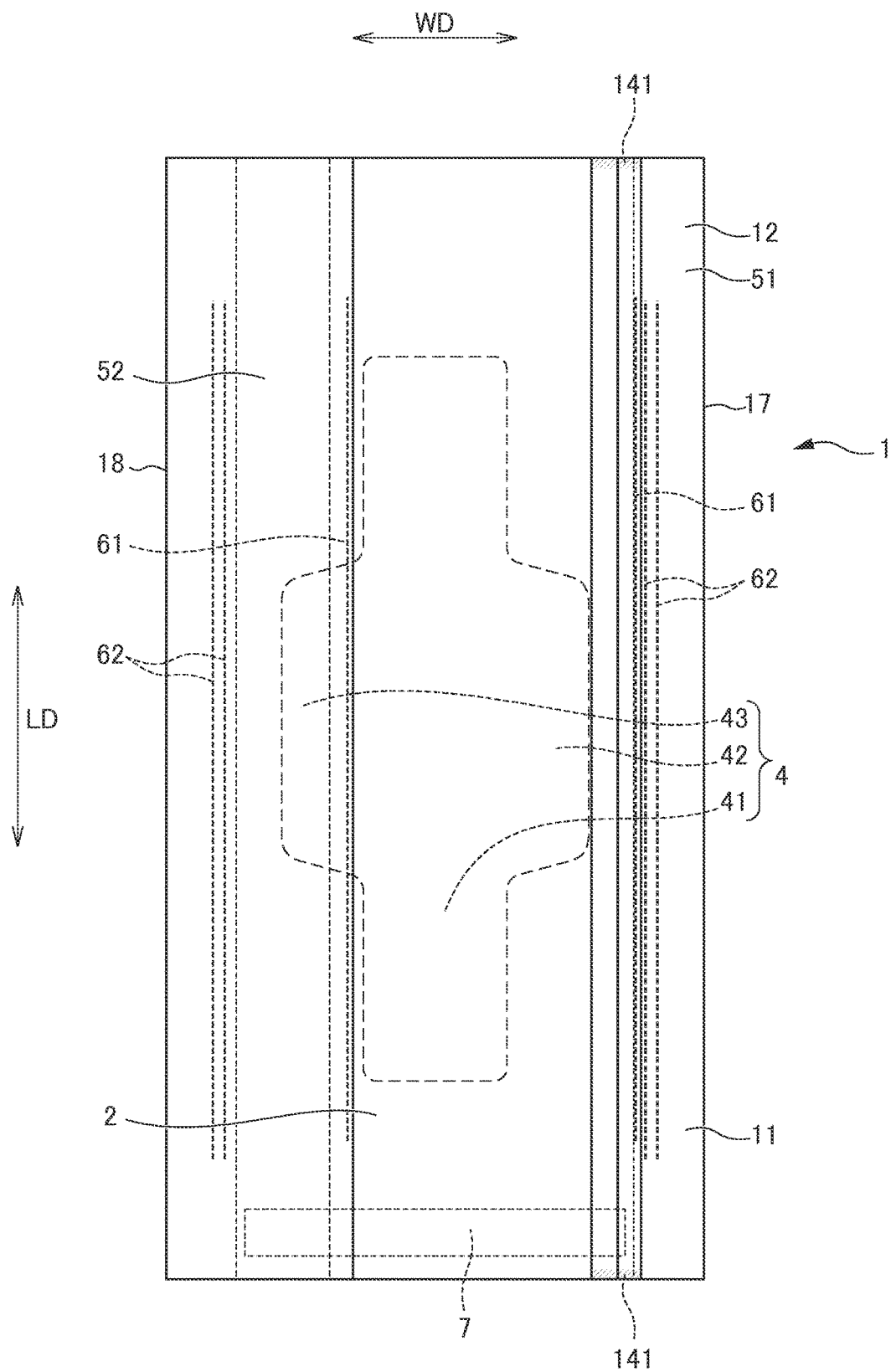
FIG. 16 is a plan view of the absorbent article for pet according to a second embodiment, as viewed from the top sheet side.

The absorbent article for pet 1 according to the second embodiment will be described hereinafter with reference to FIG. 16. FIG. 16 is a plan view of the absorbent article for pet 1 according to the second embodiment. In the description of the following embodiment(s), the same constituent features as those described with respect to the first embodiment are referred by the same reference numerals and a description thereof is omitted or simplified.

The absorbent article for pet 1 according to the second embodiment is different from the first embodiment mainly in the configuration of the absorbent core 4.

As shown in FIG. 16, the absorbent core 4 in the second embodiment further includes a second extension portion 43 that extends outward in the width direction from a central portion of the absorbent core main body in the longitudinal direction. Specifically, the second extension portion 43 extends from a side on which the second side sheet 52 is disposed, out of two longitudinal sides of the absorbent core main body 41. In the second embodiment, the width of the absorbent article main body 41 is configured to be smaller than in the first embodiment.

The second extension portion 43 is disposed in a central portion of the absorbent core main body 41 in the longitudinal direction. The second extension portion 43 is configured in the same shape and same size as the first extension portion 42.

The absorbent article for pet 1 according to the second embodiment provides the following effects, in addition to the above effects (1) to (8).

(9) The absorbent core 4 includes the second extension portion 43 that extends outward in the width direction from a side on which the second side sheet 52 is disposed, out of the sides of the absorbent core main body 41 in the longitudinal direction. The absorbent core 4 can thus be configured to be symmetrical about a central line extending in the longitudinal direction LD of the absorbent article for pet 1. As a result, the absorbent core 4 can appropriately cover the entire urinary organ regardless of a direction of putting the absorbent article for pet 1 on the pet.

In addition, as the absorbent core 4 can thus be configured to be symmetrical about a central line extending in the longitudinal direction LD of the absorbent article for pet 1, meandering of a conveyance line can be reduced in the manufacturing process of the absorbent article for pet 1. The absorbent article for pet 1 can thus be manufactured efficiently.

The preferred embodiments of the present invention have been described; however, the present invention is not limited thereto and can be modified in various manners.

For example, the position mark 8 is disposed on the back sheet side in the first embodiment; however, the present invention is not limited thereto. In other words, the position mark can also be disposed on the top sheet side.

Figure 17:
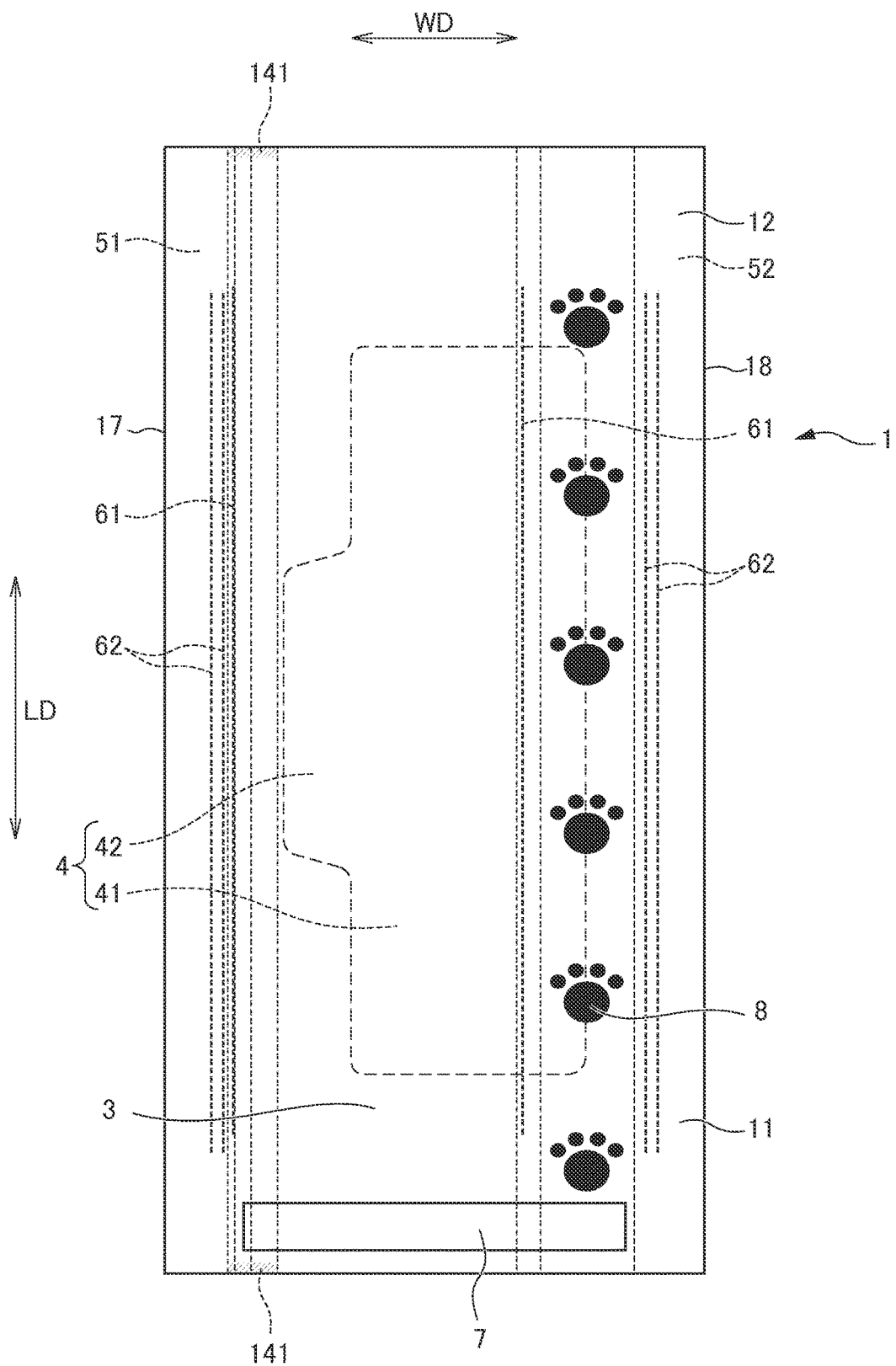
FIG. 17 is a diagram illustrating an example of arrangement of a position mark.

In addition, in the first embodiment, the position mark 8 is disposed on a side on which the second side sheet 52 is disposed in the width direction WD, in a central portion of the absorbent article for pet 1 in the longitudinal direction LD; however, the present invention is not limited thereto. In other words, a plurality of position marks 8 can be provided at predetermined intervals in the longitudinal direction LD, as shown in FIG. 17.

Furthermore, in the first and second embodiments, the back surface layer 3 is constituted of two layers: the back surface sheet 31 and the waterproof sheet 32; however, the present invention is not limited thereto. In other words, the back surface layer can also be constituted only of the back surface sheet or the waterproof sheet.

Moreover, in the first and second embodiments, the inner portion of the second gather portion 15 is joined with the top sheet 2 in the first end portion 11 and the second end portion 12; however, the embodiment of the present invention is not limited thereto. In other words, similarly to the first gather portion, the second gather portion includes a pair of releasably-joined portion that is formed by releasably joining the second gather portion in a state of being folded outward in a width direction of the absorbent article for pet (i.e., toward the front side of the pet's body), in the first end portion and the second end portion.

This application claims the benefit of Japanese Application No. 2011-132546 the entire disclosure of which is incorporated by reference herein.

The invention claimed is:

1. An absorbent article for pet configured to be worn in a state of being wrapped around a waist of a pet, and having a longitudinal direction and a width direction, the absorbent article for pet comprising:
   a liquid permeable top sheet;
   a liquid impermeable back surface layer;
   an absorbent core disposed between the top sheet and the back surface layer;
   a first end portion and a second end portion opposing to each other in the longitudinal direction of the absorbent article for pet;
   a first side portion and a second side portion opposing to each other in the width direction of the absorbent article for pet;
   a first gather portion that is disposed on a top sheet side of the first side portion and configured to stand upright from the top sheet;
   a second gather portion that is disposed on the top sheet side of the second side portion and configured to stand upright from the top sheet; and
   a pair of releasably-joined portions in which the first gather portion is releasably-joined to itself in a state of being folded outward in the width direction of the absorbent article for pet, in the first end portion and the second end portion.

2. The absorbent article for pet according to claim 1, wherein an inner portion of the second gather portion is joined with the top sheet in the first end portion and the second end portion.

3. The absorbent article for pet according to claim 1, wherein
the first gather portion includes:
a first side sheet that is disposed on the top sheet side of the first side portion, has an outer edge joined with the top sheet or the back surface layer and has an inner edge at least a part of which is a free end; and
a first elastic member that is attached to an inner edge side of the first side sheet in an extended state;
the second gather portion includes:
a second side sheet that is disposed on the top sheet side of the second side portion, has an outer edge joined with the top sheet or the back surface layer and has an inner edge at least a part of which is a free end; and
a second elastic member that is attached to an inner edge side of the second side sheet in an extended state; and
the pair of releasably-joined portions is defined by the first side sheet releasably-joined to itself in a state of being folded outward in the width direction, in the first end portion and the second end portion.

4. The absorbent article for pet according to claim 3, wherein layers of the folded back first side sheet are pressure bonded to form the releasably-joined portions.

5. The absorbent article for pet according to claim 3, wherein a density of the first side sheet is greater than a density of the top sheet.

6. The absorbent article for pet according to claim 5, wherein the density of the first side sheet is no less than $0.09$ g/cm$^3$ and no greater than $0.15$ g/cm$^3$, and the density of the top sheet is no less than $0.05$ g/cm$^3$ and no greater than $0.1$ g/cm$^3$.

7. The absorbent article for pet according to claim 5, wherein the density of the first side sheet is no less than $0.1$ g/cm$^3$ and no greater than $0.13$ g/cm$^3$, and the density of the top sheet is no less than $0.06$ g/cm$^3$ and no greater than $0.08$ g/cm$^3$.

8. The absorbent article for pet according to claim 1, wherein the absorbent core further comprises:
an absorbent core main body disposed to extend in the longitudinal direction of absorbent article for pet; and
a first extension portion extending outward in the width direction from a central portion of the absorbent core main body in the longitudinal direction.

9. The absorbent article for pet according to claim 8, wherein the absorbent core further comprises:
a second extension portion extending outward in the width direction from the central portion of the absorbent core main body in the longitudinal direction, wherein
the first extension portion is disposed on a first side on which the first side sheet is disposed, and
the second extension portion is disposed on a second side on which the second side sheet is disposed.

10. The absorbent article for pet according to claim 2, wherein the inner portion of the second gather portion is joined with the top sheet in the first end portion and the second end portion with a higher joining strength than the releasably-joined portions.

11. A manufacturing method of an absorbent article for pet, said absorbent article having a longitudinal direction and a width direction, the absorbent article comprising:
a liquid permeable top sheet;
a liquid impermeable back surface layer;
an absorbent core disposed between the top sheet and the back surface layer;
a first end portion and a second end portion opposing to each other in the longitudinal direction of the absorbent article for pet;
a first side portion and a second side portion opposing to each other in the width direction of the absorbent article for pet;
a first gather portion including a first side sheet that is disposed on a top sheet side of the first side portion, has an outer edge joined with the back surface layer and has an inner edge at least a part of which is a free end;
a second gather portion including a second side sheet that is disposed on the top sheet side of the second side portion, has an outer edge joined with the back surface layer and has an inner edge at least a part of which is a free end; and
a pair of releasably-joined portions in which the first side sheet is releasably-joined to itself in a state of being folded outward in the width direction, in the first end portion and the second end portion,
the manufacturing method comprising:
a continuous body forming step of forming a continuous body for forming the absorbent article in which a plurality of absorbent cores are arranged at predetermined intervals in the longitudinal direction between a continuous top sheet and a continuous back surface layer, and a continuous first side sheet and a continuous second side sheet are arranged on two sides of the continuous top sheet;
a first folding step of folding the sides of the continuous body such that the continuous first side sheet and the continuous second side sheet are folded back in the width direction; and
a cutting step of cutting the continuous body after the first folding step at predetermined intervals in the longitudinal direction,
wherein the pair of releasably-joined portions is formed in the cutting step.

12. The manufacturing method according to claim 11, wherein the continuous body forming step includes a step of joining an inner portion of the continuous second side sheet with the continuous top sheet in the vicinity of a position at which the continuous body is cut in the cutting step.

13. The manufacturing method according to claim 11, further comprising:
a second folding step of double-folding the absorbent article for pet, which is obtained by cutting in the cutting step, in the longitudinal direction such that the absorbent core faces itself.

14. The manufacturing method according to claim 11, wherein releasably-joined portions, in which the continuous second side sheet is releasably-joined to itself in a state of being folded in the width direction, are formed in the first end portion and the second end portion in the cutting step, and
a join of the inner portion of the continuous second side sheet with the continuous top sheet has a higher joining strength than the releasably-joined portions of the continuous second side sheet, thereby permitting the releasably-joined portions of the second side sheet to be released when the absorbent article for pet is opened outwardly.

* * * * *